United States Patent
Minnebo et al.

(10) Patent No.: US 6,962,400 B2
(45) Date of Patent: Nov. 8, 2005

(54) SUB-DOT PHASE MODULATION FOR COMPUTER TO PLATE INKJET SYSTEM

(75) Inventors: Luc Minnebo, Brasschaat (BE); Koen Vande Velde, Duffel (BE); Paul Delabastita, Antwerp (BE)

(73) Assignee: Agfa Gevaert N.V., Mortsel (BE)

( * ) Notice: Subject to any disclaimer, the term of this patent is extended or adjusted under 35 U.S.C. 154(b) by 204 days.

(21) Appl. No.: 10/667,261

(22) Filed: Sep. 17, 2003

(65) Prior Publication Data

US 2004/0113958 A1 Jun. 17, 2004

Related U.S. Application Data

(60) Provisional application No. 60/413,621, filed on Sep. 25, 2002.

(30) Foreign Application Priority Data

Sep. 17, 2002 (EP) .............................. 02102364
Sep. 12, 2003 (EP) .............................. 03103372

(51) Int. Cl.$^7$ ............................ B41J 2/205; B41N 1/00; G06K 15/00
(52) U.S. Cl. ......................... 347/15; 358/3.03; 101/453
(58) Field of Search ................... 347/15, 43; 358/3.03, 358/3.05, 3.06, 3.12; 101/453, 465, 466

(56) References Cited

U.S. PATENT DOCUMENTS 5,864,406 A * 1/1999 Isaka et al. ................ 358/3.03
6,846,613 B2 * 1/2005 Vermeersch et al. ..... 430/272.1

* cited by examiner

Primary Examiner—Lamson Nguyen
(74) Attorney, Agent, or Firm—John A. Merecki; Robert A. Sabourin

(57) ABSTRACT

Printing masters are produced by use of an inkjet printing system.

The smallest halftone dot size which can be printed by the inkjet printing system is larger than the size of a pixel of the recording grid defined by the addressability of the printing device.

The error diffusion algorithm is especially adapted to make use of the high addressability of the recording system.

Using a sub-dot phase modulated error diffusion halftoning algorithm allows for the distance between the halftone dots to be modulated in much smaller increments than the size of the halftone dots themselves.

Results can be further improved by dynamically influencing the threshold value in the error diffusion algorithm in accordance with previous output quantisation determinations.

Variable coverage percentage of the pixels can be taken into account.

The method can be extended to multilevel systems.

10 Claims, 13 Drawing Sheets

SUB-DOT PHASE MODULATION FOR COMPUTER TO PLATE INKJET SYSTEM

The application claims the benefit of U.S. Provisional Application No. 60/413,621 filed Sep. 25, 2002.

FIELD OF THE INVENTION

The present invention relates to a method for making a printing master in a computer to plate system.

More specifically the invention is related to making printing plates using an inkjet printing system.

BACKGROUND OF THE INVENTION

Printed articles are produced on a press using printing plates or printing masters which can work using different printing techniques:

offset printing using ink repellent and ink attracting areas on the printing master, flexography using compressible relief printing plates, gravure printing, silk screen printing, etc.

For single colour (e.g. black and white) printing only a single printing master is needed.

For colour printing using more than 1 ink, a separate printing master for each colour of ink is needed. The receiving layer, e.g. paper, sequentially passes the different printing masters on the press. A colour printing system often used is one making overprints of yellow, magenta, cyan and black ink on paper. The four overlapping colour images combine to form a representation of the colour image.

Nowadays the printing masters are preferable fabricated using a Computer to Plate (CtP) system: the image to be reproduced is electronically provided in digital form, is halftoned and is subsequently directly imaged on a printing plate precursor to obtain, after processing if required, a printing master used on a printing press.

A Ctp system comprises following elements:

A digital halftoning module

A recording apparatus

These elements of the CtP system will be described more detailed hereunder.

Digital Halftoning Module

The input image delivered in an electronic form to the halftoning module (raster image processor or RIP) is a continuous-tone image, i.e. a digital image containing pixels, which are the smallest picture elements, having multiple grey levels and/or colour levels with no perceptible quantisation to them. Most often each colour is represented using 256 different levels.

In a standard printing process however only two levels exist that can be reproduced. Either ink is present or no ink is present.

Modern printing systems exist that are capable of printing more than 2 levels, but even then the number of levers is to limited for faithful image reproduction.

In the halftoning module the continuous-tone input image, possessing a full range of tones from white through greys to black, is converted to an output image having output pixels wherein only a limited number of grey levels are possible.

In binary halftoning the output values correspond to either black or white, likewise in colour printing full colour or no colour is the result of binary halftoning.

In multilevel halftoning the continuous-tone image is converted to an image with pixels having a value out of at least 3 different levels. The pixel may be white, black or can have intermediate grey values. Besides no ink deposition in printing, multiple levels of ink can be placed on a pixel.

A digital halftoning technique converts the multiple density values of the input pixels of a continuous tone input image into a geometric distribution of binary or multilevel halftone dots that can be printed by the reproduction device.

Each halftone dot is reproduced as a microdot or as a clustered set of microdots. A microdot is the smallest element that can be written by a reproduction device.

When the halftone dots are small enough, the eye is not capable of seeing the individual halftone dots, and only sees the corresponding spatially integrated density value of the geometric distribution.

The two main classes of halftoning techniques that are used are known as "amplitude modulation screening" (abbreviated as AM screening) and "frequency modulation screening" (abbreviated as FM screening).

According to amplitude modulation screening, the halftone dots, that together give the impression of a particular tone, are arranged on a fixed geometric grid. By varying the size of the halftone dots, the different tones of an image can be simulated. FIG. 1 shows a degrade rendered with AM screening.

According to frequency modulation screening, the distance between the fixed sized halftone dots is modulated to render different tone values. FIG. 2 shows the same degrade as in FIG. 1, but rendered with FM screening. Frequency modulation is sometimes called "stochastic screening", because most FM screening algorithms produce halftone dot patterns that are stochastic (non-deterministic) in nature.

Three methods are widely used to produce FM screens.

A first method relies on comparing an image on a pixel-by-pixel basis with a threshold function to obtain FM-screened images. Methods to obtain such a threshold function are described in the patents U.S. Pat. No. 5,535,020, U.S. Pat. No. 5,745,259, U.S. Pat. No. 5,912,745 and U.S. Pat. No. 6,172,773 by Robert Ulichney and in the patents U.S. Pat. No. 5,543,941, U.S. Pat. No. 5,708,518 and U.S. Pat. No. 5,726,772 by Theophano Mitsa and Kevin Parker.

Lawrence Ray and James Sullivan explain a second method in WO91/12686. According to this method, continuous tone images are directly converted into frequency modulation halftones by addressing in a tone dependent way pre-calculated bitmaps that are stored in a memory.

A third method for frequency modulation was originally invented by Floyd and Steinberg and is called error diffusion. FIG. 3 explains how it works.

The continuous tone pixel values P have a range from 0.0 (full black) to 1.0 (full white). A modified pixel value Pi of the unscreened image is compared with a fixed threshold T. If Pi is smaller than T, Hi is set to 0.0 and a black pixel is printed, else Hi is made equal to 1.0 and a white pixel is defined. The binarization of Pi introduces a quantisation error Ei equal to Pi−Hi. According to the error diffusion scheme, this quantisation error value is added to one or more of the unscreened pixels Pi+x,j+y, thereby generating a modified pixel value for Pi+x,j+y. Different pixels receive different fractions of the original error and this is controlled by means of "diffusion weights" c1 to cn. The sum of the diffusion weights always adds up to one. Because this scheme acts like a feedback loop, the average quantisation error value converges to zero in steady state.

Robert Ulichney describes a number of enhancements over the original error diffusion algorithm in U.S. Pat. No. 4,955,065. This patent describes the use of a serpentine scan to process the input pixel values, the addition of noise on the threshold and the perturbation of the error diffusion weights to obtain more a uniform and isotropic halftone dot distribution.

Significant improvements of the original error diffusion scheme are also described in the patents U.S. Pat. No. 5,045,952 and U.S. Pat. No. 5,535,019, both by Reiner Eschbach. According to the disclosure in these patents, the threshold is modulated to either obtain an edge enhancement effect (first patent) or to improve the homogeneity of the halftone dot distributions in high and low intensity image regions (second patent). In U.S. Pat. No. 5,070,413 James Sullivan explains an improvement for screening colour images by performing error diffusion in a colorant vector space as opposed of doing scalar error diffusion for each of the colorants individually. Koen Vande Velde presented a further improvement of this idea at the International Conference on Digital Printing Technologies conference (proc. NIP17, IS&T 2001) which cal also be found in EP01239662. His algorithm consists of a vector error diffusion scheme in which the quantisation of a colour into a set of inks is constrained by the output from an additional pre-processing step in such a way that luminance variations—and correspondingly halftoning graininess—are minimised in the final output. In U.S. Pat. No. 5,565,994 Eschbach proposes a method that aims for a similar objective but works differently.

An improvement that is relevant with regard to our invention is also found in U.S. Pat. No. 5,087,981 by Yee Ng. In this patent Yee Ng describes the use of a printer model that takes into account halftone dot overlap to compensate for the non-linearity of printer gradation. In U.S. Pat. No. 5,854,882 by Shenge Wang, a practical method is described to characterise the dot overlap of a printer. Similar concepts regarding introducing printer models and models of the human visual system are described in the articles "Measurement of printer parameters for model based halftoning" by Thrasyvoulos N. Pappas, Chen-Koung Dong and David L. Neuhoff, published in the Journal of Electronic Imaging, July 1993 Vol. 2(3), pp 193–204. David Neuhoff patents some of the concepts presented in this article in U.S. Pat. No. 5,463,472. In U.S. Pat. No. 6,266,157, Zhigang Fan also explains a practical and efficient approach to model and calibrate the effects of dot overlap into an error diffusion scheme.

> Victor Ostromoukhov points out in his presentation "A Simple and Efficient Error-Diffusion Algorithm", published in the proceedings of the SIGGRAPH2001 conference, that more uniform halftone dot distributions are obtained at various tone values by adjusting the diffusion weights as a function of tone.

As shown in FIG. 4, in the standard FM halftoning algorithms, it is implicitly assumed that the size of the printed microdots 1 is in the same order as the size of the pixels 2 of the addressable grid of the printer and also corresponds with the size of the pixels in the original image. This assumption can create problems in printing processes where halftone dots with the size of one pixel are too small to be properly rendered. An example of such a printing process is the electrophotographic printing process. A possible solution for this problem is disclosed in U.S. Pat. No. 5,374,997 by Reiner Eschbach in which he proposes the use of an error diffusion method that makes the halftone dot n by m times larger than the size of the addressable pixels of a printer.

In one of the embodiments he explains that by means of counters the preliminary output pixels of an error diffusion process can be replicated N times horizontally and M times vertically to obtain larger halftone dots 3. The output of this scheme for the case that N=M=2 is shown in FIG. 5.

When a single colour is used in printing, the error diffusion algorithm has to be applied to the single colour.

When multicolour printing is used, each colour component needs to be processed by the halftoning algorithm.

The Recording Apparatus

The most widely used CtP system in the graphic world is a system makes use of a laser recorder for making a printing master.

Usually a infrared laser system exposes microdots corresponding to pixels on the printing plate precursor. Small spots on the plate are irradiated wherein the radiation induces chemical or structural changes within the printing plate precursor and after imaging and processing (depending upon the type of printing plate) a ready to use printing master is obtained.

In U.S. Pat. No. 6,071,369 an external drum recorder is used. Following examples are given regarding spot size etc . . . :

> Infrared laser emitting at 1.06 $\mu$m with a scan speed of 17 m/s, spot size of 10 $\mu$m and an energy in the plane of 248 mJ/cm$^2$. Dwell time of the laser spot can be determined at 0.7 $\mu$s.
>
> Infrared laser emitting at 1.06 $\mu$m with a scan speed of 2.2 m/s, spot size of 10 $\mu$m and an energy in the plane of 248 mJ/cm$^2$. Dwell time of the laser spot can be determined at 4.8 $\mu$s.

For each laser recording system following characteristics are important:

Dot Size

The dots which can be imaged on the printing plate precursor can have different sizes. Preferably a CtP system writes microdots having a constant size. The dot size usually is in de range of 7 $\mu$m to 20 $\mu$m depending upon application.

Addressability

Another property of a Ctp system is the addressability or resolution. This means how precise a dot can be placed on the plate and is usually expressed in the number of pixels/mm or pixels/inch. All possible locations a dot can be placed form a grid.

In laser recorders small dots are placed within the grid to form the image to be reproduced. The grid can have a resolution up to 2400 dpi (e.g. in the AGFA Xcalibur thermal platesetter). This corresponds to a pixel sizes of about 10 $\mu$m Laser systems can control the laser spot and shape easily so dots only overlap slightly to fill the grid. The values of dot size and addressability closely relate to each other.

Recently also CtP processes using inkjet recording systems have been suggested to be used in preparing printing plates. An example of such a system and the elements found in it is shown in FIG. 6.

In this case the printing plate precursor 4 is usually on a rotatable drum 5 and an inkjet printing head 6 mounted aside the drum 5 jets ink or reaction fluid onto the printing plate precursor 4 while the drum 5 rotates. As the drum 5 rotates, the inkjet printhead 6 slowly traverses the length of the drum 5 and on a line by line basis the image is recorded.

Normally the inkjet printhead 6 has several nozzles 7 to jet ink so that multiple lines 8 can be recorded during a single rotation.

The inkjet printhead 6 consists of a plurality of separate tiny chambers, containing ink, coupled to a ink supply and having a nozzle 7 at the end.

With thermal inkjet technology, tiny resistors rapidly heat a thin layer of liquid ink. The heated ink causes a vapour bubble to be formed, expelling or ejecting drops of ink through the nozzles 7 and placing them precisely on a surface to form text or images. As the bubble collapses, it creates a vacuum that pulls in fresh ink. This process is repeated thousands of times per second. With thermal inkjet technology, water-based inks are used.

Piezoelectric printing technology, commonly called piezo, pumps ink through nozzles using pressure, like a squirt gun. A piezo crystal used as a very precise pump places ink onto the printing medium. A wide range of ink formulations (solvent, water, UV curable) may be used. By jetting drops of fluid, plate properties are locally influenced by chemical reaction or a printing master is formed by the properties of the image-wise applied ink itself.

Some examples can be found in U.S. Pat. No. 5,275,689, and it is also possible to form a relief printing plate directly on the plate precursor 4.

In US 2003/007052 a method and apparatus is described for production of lithographic printing plates using an inkjet printing system. No indication is given regarding drop volume or dot size.

Most important properties for an inkjet printing system are:
Drop Volume and Dot Size:

The drop jetted to the printing plate precursor will have an effect on a limited area on the plate. For known printing systems it was measured that a drop volume of 3 picoliter when printed on a aluminium receiving layer normally results, due to surface tension in a dot having a diameter of 20–30 $\mu$m.

Addressability

In modern inkjet printing systems addressability is high. Precise positioning systems and printheads allow for the use of a very dense grid having high resolution 115 dots/mm (2875 dpi)

A example of a recording grid and printed dots in inkjet printing is shown in FIG. 7. It is clear that the size of an addressable pixel and a halftone dot differ significantly.

Ctp systems using inkjet printing systems have certain advantages.

There is no need for processing of the printing plate with a special developer after the image is jetted onto the plate. An aqueous developer is all that is needed. No extra chemical for development of the image is needed resulting in a more ecological production method. This allows for easy and cheap fabrication of printing plates.

No special dark room conditions are needed.

Production time can be shortened.

It is possible to perform recording of the plate in a on-press configuration.

One of the most popular halftoning methods used in CtP is the error diffusion aloritm. The state of the art error diffusion algorithms however have certain drawbacks which are described hereinafter. Certain drawbacks are especially important when using inkjet printing for making printing masters.

Artifacts Near "Rational Tonal Values" (¼, ⅔, ¾, ⅑, ⅖, ⅜, etc.)

A first problem of the original error diffusion as published by Floyd and Steinberg, is that it does not behave well around the tone value of ½ and tone values that are multiples of ¼ and ⅓. At and around these tone values, the standard error diffusion algorithm produces halftone dot distributions that are highly phase correlated, i.e. the dot distributions tend to be organized in locally regular, self-repeating patterns.

To explain why this problem occurs, we will concentrate first on the behavior of the Floyd and Steinberg algorithm near 50%. When Floyd and Steinberg error diffusion is performed on a tint with exactly a 50% tone value, all of the halftone dots are laid out in a checkerboard configuration. This pattern is indeed the most optimal distribution of halftone dots for this tint as it minimizes the average distance between the dots and hence also minimizes the visibility of the halftone dot pattern. For tone values just above 50% tone value, however, the algorithm will introduce an extra white pixel here and there in order to produce the correct average tone value. This extra white pixel will inevitably disturb the phase of the checkerboard pattern. FIG. 8 shows an example in which a tone value of $128/255$ was rendered by means of standard Floyd and Steinberg error diffusion. These local phase shifts disturb the otherwise regular pattern, and are picked up by the eye as a disturbing artifact. A similar situation occurs for tone values just below 50%.

A similar problem also exists around the 75% tone value. At exactly 75%, Floyd and Steinberg error diffusion produces a pattern in which one out of four pixels is black and three out of four pixels are white, with all the pixels arranged in a repeating two by two matrix pattern. Just above and below this tone value, this regular pattern is disturbed by the introduction of an extra white or black pixel. An example of a $192/255$ tonal value rendered with Floyd and Steinberg is shown in FIG. 9. A similar behavior is seen around a tonal value of 25% and near tonal values that are multiples of ⅑ or ¹⁄₁₆.

Robert Ulichney already recognized the above problems, and the method he proposes in U.S. Pat. No. 4,955,065 is effective in reducing the above undesirable artifacts. However, the use of a random element in his algorithm also introduces graininess into the image. Furthermore does his method diffuse the artifacts, rather than fundamentally suppressing them.

This statement is appreciated by comparing the halftone rendered with standard Floyd and Steinberg error diffusion and shown FIG. 8 with the halftone rendered using the improved method according to Ulichney and shown in FIG. 10.

It is an objective of the invention to avoid the introduction of objectionable artifacts in FM screening without introducing graininess in the halftoned image.

Phase Correlated Dot Positions may Introduce Low Frequency Graininess or Patterns in Color Printing A consequence of correlated dot positions within a single separation is that it indirectly leads to phase correlation of the dot positions in the different ink separations in the case of color printing. This may introduce low frequency artifacts such as patterns and noise. Moreover, these artifacts shift and change unpredictably in the presence of misregistration between the separations.

We explain this by means of an example. Imagine a color that is printed with cyan and magenta ink separations, both having a value of $128/255$. The Floyd and Steinberg algorithm produces for these tint values dot distributions that look like in FIG. 11A and FIG. 11B.

When these two separations are printed on top of each other in nearly perfect register as in FIG. 11C, they produce four possible ink overlap combinations: no ink, only cyan ink, only magenta ink, or cyan and magenta ink overprints. Because of the phase correlation of the halftone dots in the original separations, the overlap combinations themselves will also be correlated. In FIG. 11C this leads to two sorts of areas. In a first sort of area, most of the cyan and magenta dots fall on top of each other and produce a matrix of cyan and magenta overprinted dots and white spaces. In a second sort of area most of the cyan and magenta dots fall in between each other and produce a matrix of magenta and cyan dots with no or few white spaces present. Both sorts of areas produce a different color since the colorimetric addition of white and cyan on top of magenta dots does not yield exactly the same color as the colorimetric addition of cyan and magenta dots. The net result is that the color balance is not stable across the printed reproduction and that the print will appear blotchy.

When the registration between the two separation changes as in FIG. 11D, for example due to some mechanical instability of the printer or the substrate, the areas of the first kind may turn into areas of the second kind and vice versa. So not only is the color balance unstable across the print, it also varies with the registration of the printer and becomes unpredictable in the presence of misregistration. As both FIG. 11C and FIG. 11D show, the correlated artifacts in the individual separations can give yield to low frequency patterns that were not present in any of the original separations and that change as a function of the registration between the original separations.

What the above explanation shows is that correlation of the halftone dot positions can result in low frequency graininess and patterning, and in locally unstable color balance in the presence of misregistration.

The existing art uses the introduction of a random element such as the perturbation of weights or the addition of noise to the threshold in error diffusion to break up the phase correlated dot positions, but this—as was mentioned before—also introduces graininess in the halftoned image.

It is an objective of the invention to improve the stability and predictability of the color balance in frequency modulation halftoning for color printing and to avoid the introduction of low frequency artifacts without introducing graininess into the image.

The Fixed Halftone Dot Size in Error Diffusion Represents a Compromise

The method presented in U.S. Pat. No. 5,374,997 by Eschbach discloses the generation of halftone dots, consisting of adjacent pixels, that are N by M times larger than the size of one pixel of a printing device. In reality, the choice of the optimal values for "N" and "M" represents a compromise between stability of printing, graininess and detail rendition.

A major cause of instability of printing density and color balance are the effects (deterministic or stochastic in both space and time) near the boundaries of halftone dots. This explains why large halftone dots, having less boundary length for covering the same total area, generally print more stable than small halftone dots. This argument favors using larger halftone dots consisting of clusters with more adjacent pixels. This is particularly the case for midtone reproduction, since the total amount of halftone dot circumference and the effect of printer variability are largest in that part of the tone scale.

The use of large, fixed sized halftone dots, however, has also drawbacks. For a given tone value, the use of larger halftone dots also leads to a larger average distance between them, and particularly in the highlights and shadow tones, where this distance is already at its largest, this may lead to visibility of the halftone patterns and a grainy appearance. So this argument actually favors the use of clusters consisting of fewer pixels.

Large, fixed sized halftone dots may also compromise detail rendition. The proper rendering of fine textures, for example, benefits from printing with small pixel clusters. For the rendering of text and line art, the cluster size preferably even is only one pixel, as this allows for full resolution rendering of the contours of these elements.

Some of the problems are especially more prevalent in an inkjet printing systems for making printing masters. This is due to the large difference between the resulting dot size and the addressability of the recording system. Drops have a minimum volume and will in combination with the printing plate precursor result in a relatively large minimum dot size. These systems are also characterised in an overall large dot gain.

The standard algorithms for error diffusion or masked based frequency modulation often result in inferior image quality. They do not take into account the special properties of the modern inkjet printing systems.

Hitherto no system exists for CtP using an inkjet printing system with a specially adapted halftoning algorithm to obtain optimum results.

SUMMARY OF THE INVENTION

The above-mentioned advantageous effects are realised by a method having the specific features set out in claim 1. Specific features for preferred embodiments of the invention are set out in the dependent claims.

Further advantages and embodiments of the present invention will become apparent from the following description and drawings.

DETAILED DESCRIPTION OF THE INVENTION

While the present invention will hereinafter be described in connection with preferred embodiments thereof, it will be understood that it is not intended to limit the invention to those embodiments.

The problem is solved by the system and method wherein a printing master is generated using an inkjet printing system while combining them in combination with a special adapted error diffusion algorithm which is called a sub dot phase modulated error diffusion algorithm which is described hereinafter.

The sub-dot phase modulation error diffusion algorithm has the advantage that the characteristics of the ideal frequency modulation technique are approximated by making use of the high addressability of the recording system that is not infinite but that is substantially higher that the size of the halftone dots in the inkjet printing system.

By allowing the distance between the halftone dots to be modulated in much smaller increments than the size of the halftone dots themselves, a frequency modulation halftoning system is obtained that offers advantages in suppressing artifacts near rational tonal values. We call this principle "sub-dot phase modulation". Since with sub-dot phase modulation the position of the halftone dots is controlled with a precision that exceeds the size of the halftone dot, the relative distance between the halftone dots can also be controlled with much greater accuracy than in standard frequency modulation.

A printing method having the specific features of the claims is able to modulate the distance between the halftone dots by taking into account the effect of density value changes caused in an area in the output image by placement of the large inkjet dot.

Especially the combination of a sub-dot phase modulation with inkjet printing has the advantage that the error diffusion algorithm can be adjusted in function of the recording system.

We define an error diffusion process as follows: a method for converting an image consisting of unprocessed input pixels having n1 possible values representing optical densities into an output image represented by processed pixels having n2 possible values representing optical densities, where 1<n2<n1. The processing of a pixel comprises:

a quantisation step in which the value of a processed pixel is determined from the value of a modified pixel;

an error value calculation step in which the difference between the modified and the processed pixel is determined;

an error diffusion step in which at least one unprocessed pixel is modified by at least a portion of the quantisation error value.

Standard Error Diffusion

Figure 1:
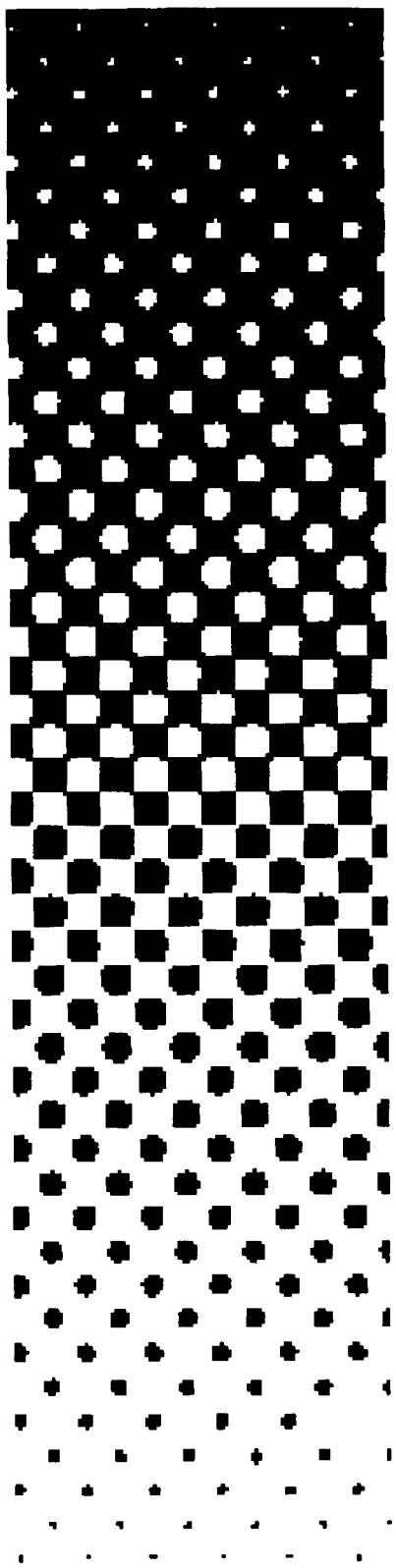
FIG. 1 shows a degrade represented by halftoning using AM screening.
Figure 2:
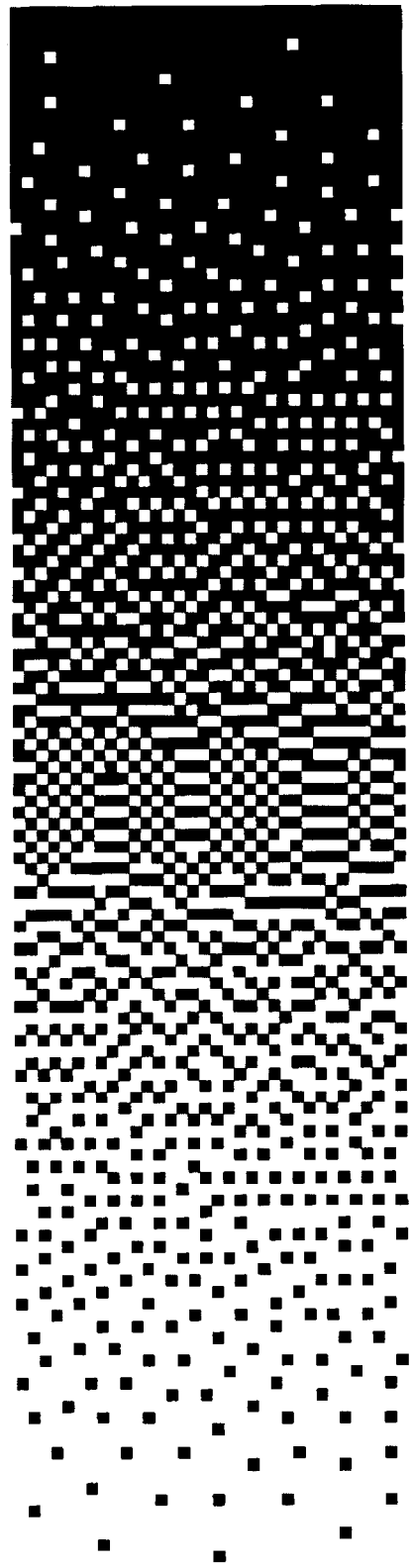
FIG. 2 shows a degrade represented by halftoning using FM screening
Figure 3:
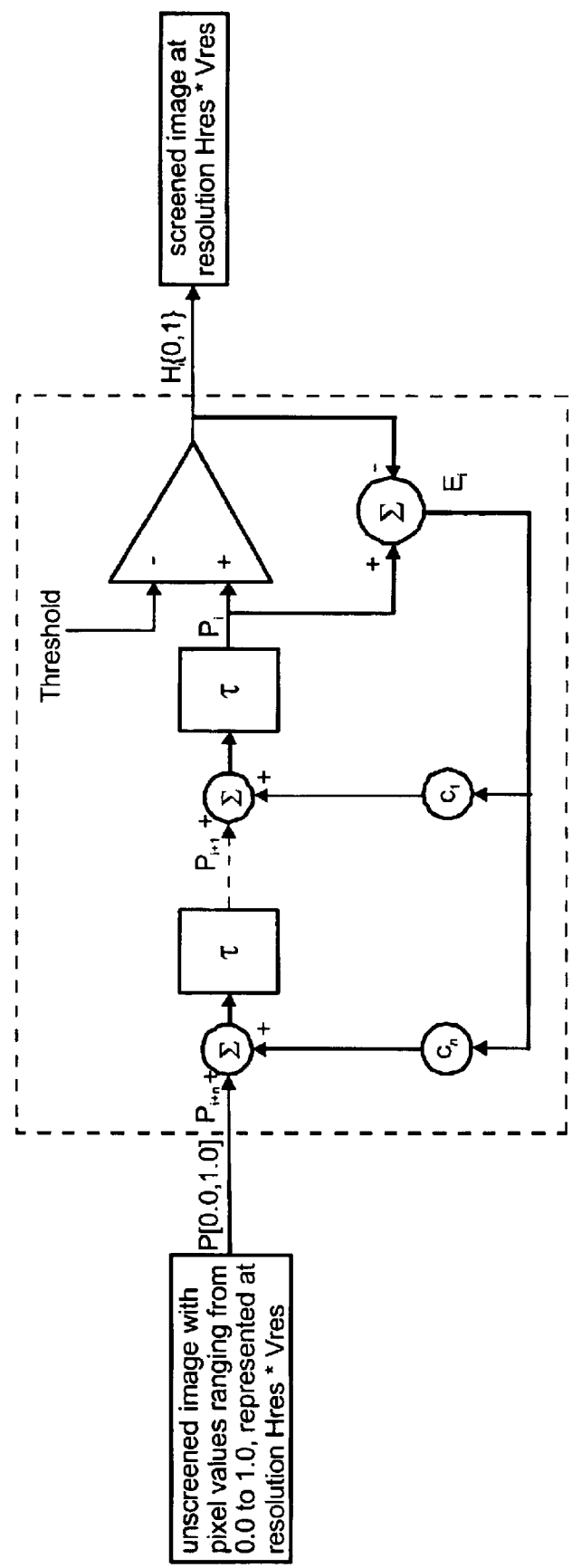
FIG. 3 gives the basic working diagram of error diffusion halftoning.
Figure 4:
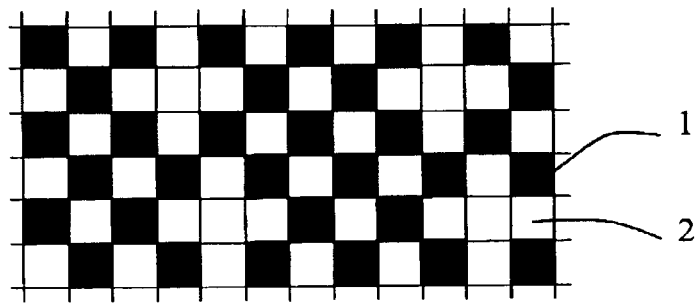
FIG. 4 shows the correspondence of dot size and grid resolution in standard FM halftoning.
Figure 5:
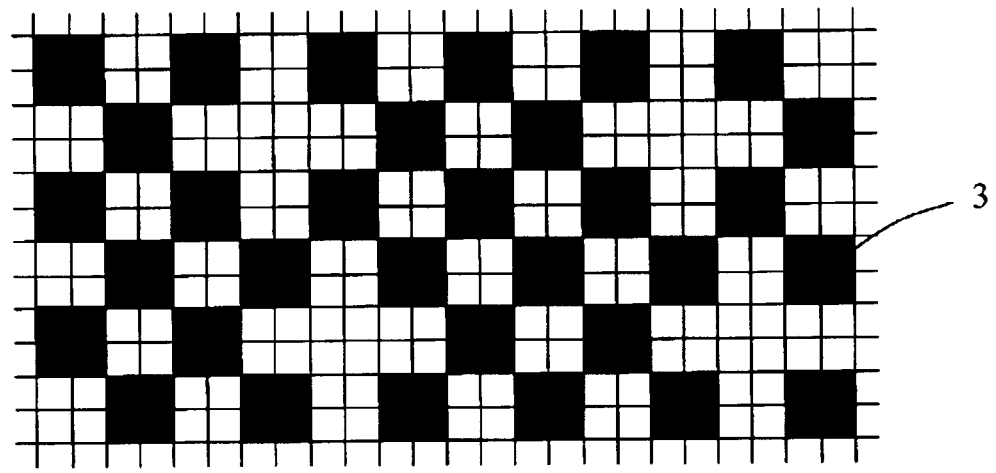
FIG. 5 illustrates the use of pixel replication to obtain larger dots.
Figure 7:
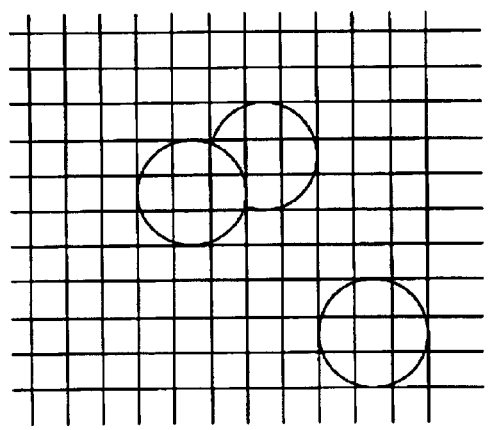
FIG. 7 illustrates the relation of recording grid and printed dots in inkjet recording.
Figure 6:
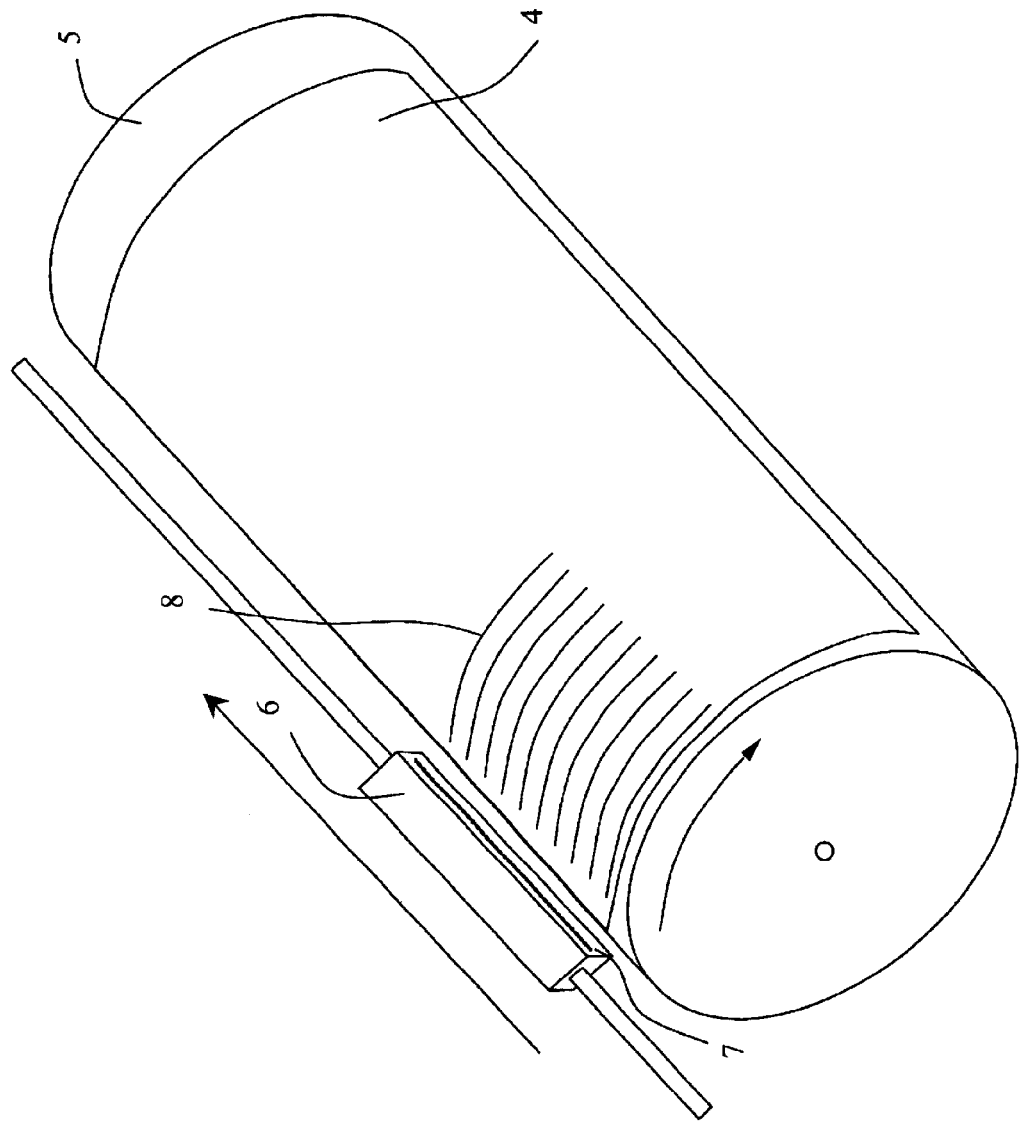
FIG. 6 depicts an inkjet recorder with the different components.
Figure 8:
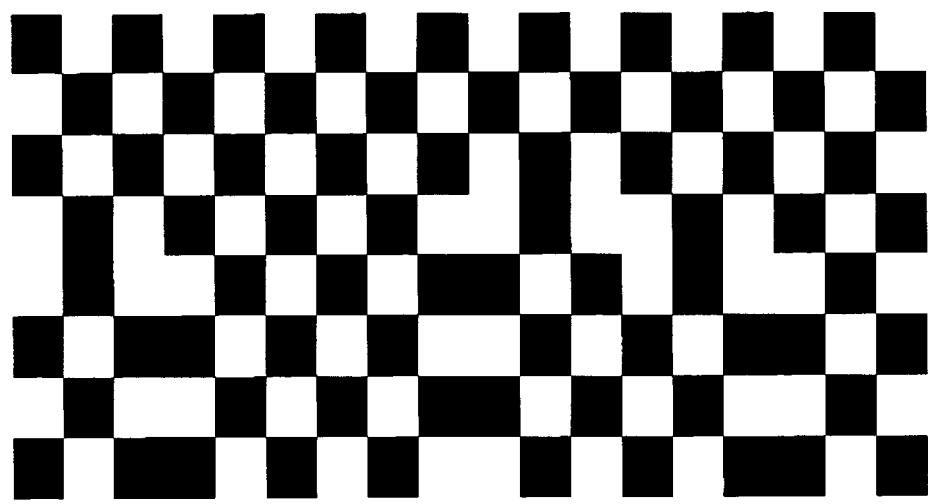
FIG. 8 gives an example of a tone value of $^{128}\!/_{255}$ rendered by means of Floyd and Steinberg error diffusion.
Figure 9:
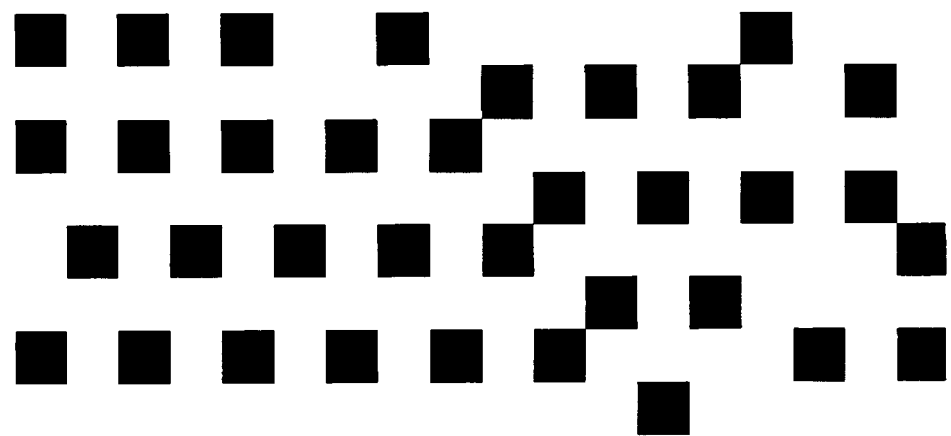
FIG. 9 shows the rendering of a $^{192}\!/_{255}$ tonal value using the Floyd and Steinberg process.
Figure 10:
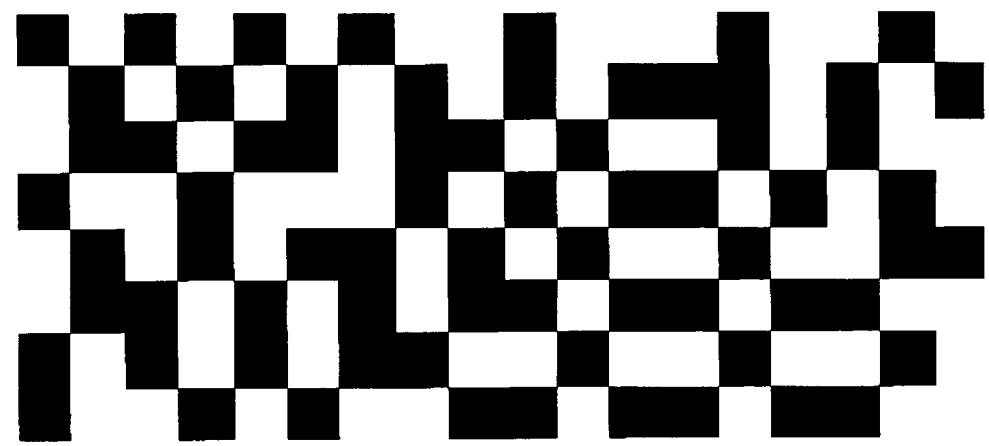
FIG. 10 gives the rendering of a $^{128}\!/_{256}$ tonal value using the improved method according to Ulichney.
Figure 11A:
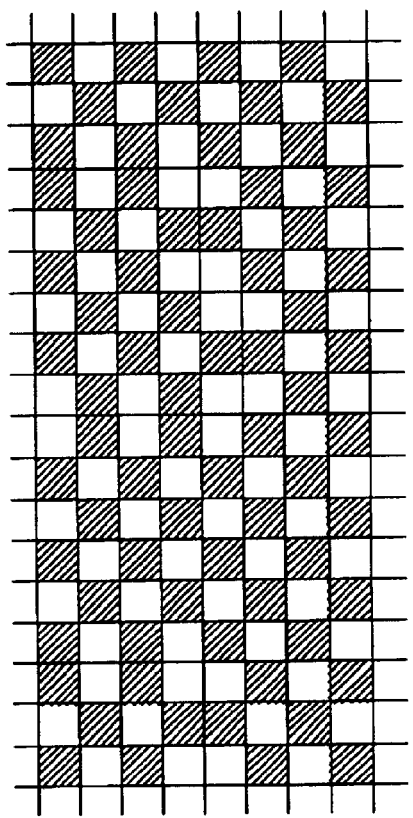
FIG. 11A gives the rendering of a value of $^{128}\!/_{256}$ for the cyan ink
Figure 11B:
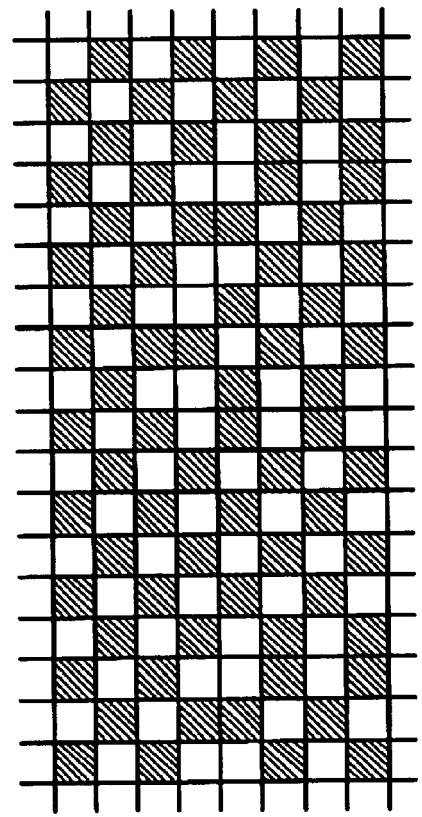
FIG. 11B gives the rendering of a value of $^{128}\!/_{255}$ for the magenta ink
Figure 11C:
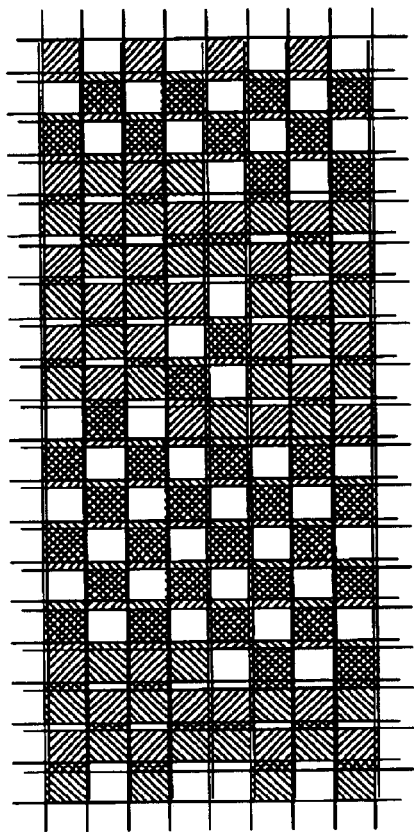
FIG. 11C shows the result of the overprint of 11A and 11B in perfect register.
Figure 11D:
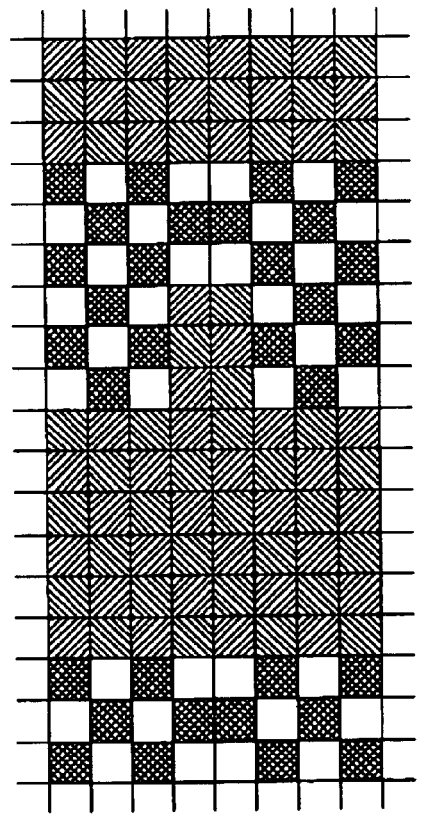
FIG. 11D shows the result of the overprint of 11A and 11B having register defects.
Figure 12A:
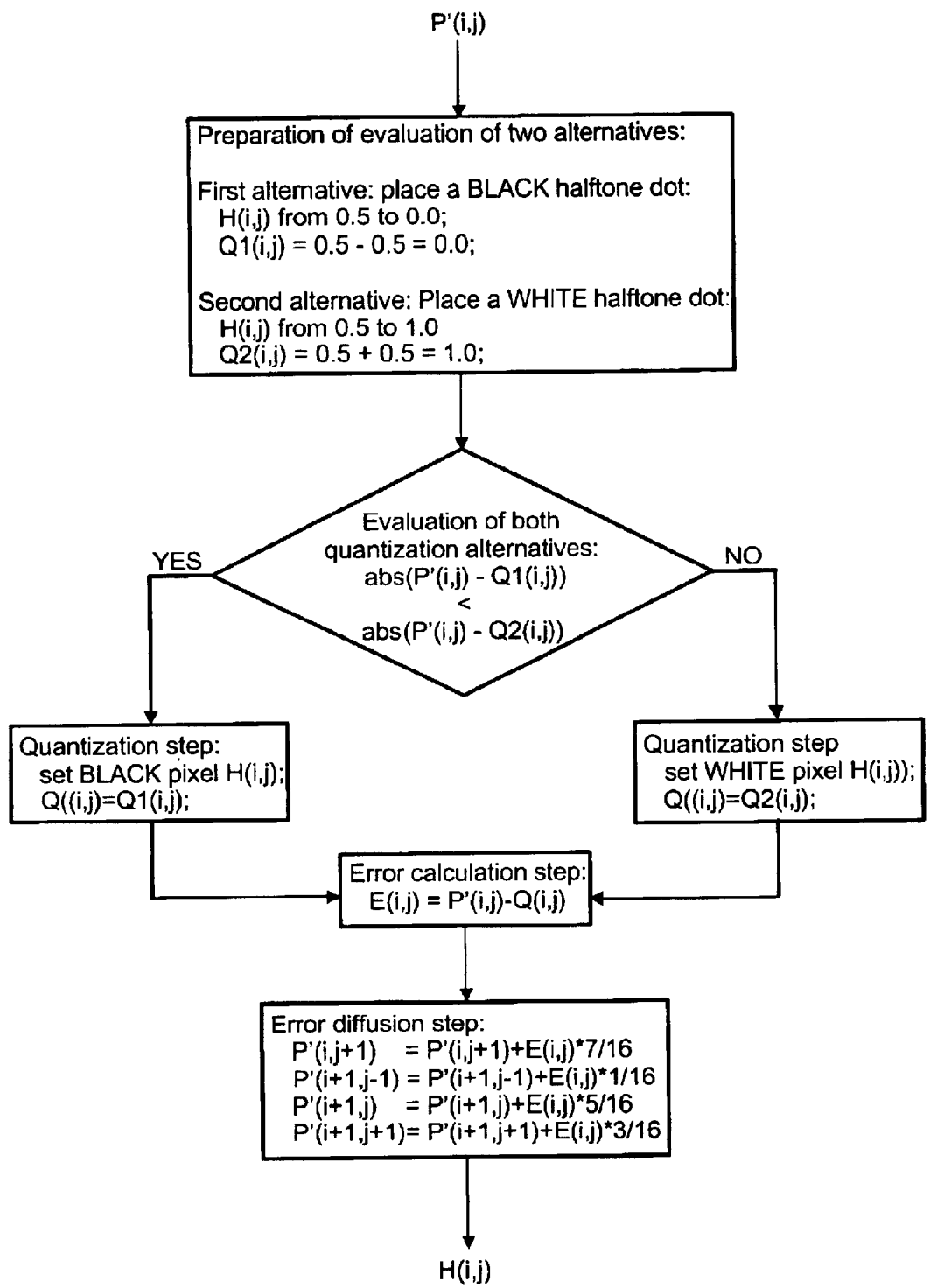
FIG. 12A shows a less conventional description of the standard error diffusion process.

Before explaining in detail a method according to the invention, we start by presenting the standard error diffusion process from a slightly unconventional perspective by way of reference. Illustration is given in FIG. 12A.

In what follows, we take on the convention that the origin (0,0) of the image corresponds with the top left corner, that the value 0.0 represents "black", while 1.0 represents "white".

Placing a halftone dot means printing a black spot on a white canvas.

We define

P(x,y) as the input pixels or input pixel value of the original image,

P'(x,y) as the modified pixels of the original image modified with a contribution of the error made on previous processed pixels obtaining a modified pixel value, and H(x,y) as the pixels of the halftoned output image. The error diffusion process will transform every input pixel P(x,y) into a halftone output pixel H(x,y).

Before the processing starts, the output pixel values of the halftoned image are all preset to 0.5. According to the approach, the error diffusion process consists of replacing the preset values of H(x,y) by either 0.0 or 1.0 in a way that an optimal halftone rendering is obtained of the original image.

The processing of an image normally is performed line by line, starting at the top of the image. Within a line, the processing takes place from left to right, or from right to left, or—preferably—alternating between these two directions as suggested by Robert Ulichney in U.S. Pat. No. 4,955,065. The latter approach is called "serpentine scan".

The processing of a pixel P'(i,j) at position (i,j) consists of the following steps that are also represented in FIG. 19.

1) Determining a quantisation set consisting of the two possible quantisation values $Q_1(i,j)$ and $Q_2(i,j)$ that correspond to the available distinct cases of:
   a. Converting the gray pixel H(i,j) into a black pixel by decreasing the preset halftone value H(i,j) from 0.5 to 0.0; The quantised value $Q_1(i,j)$ in that case is 0.0;
   b. Converting the gray pixel H(i,j) into a white pixel by increasing its value from 0.5 to 1.0. The quantised value $Q_2(i,j)$ in that case is 1.0.

2) If $Q_1(i,j)$ is closer to P'(i,j) then H(i,j) is set to 0.0 and $Q(i,j)=Q_1(i,j)$ else H(i,j) is set to 1.0 and $Q(i,j)=Q_2(i,j)$. Using this criteria a selection is made of a quantisation value out of the quantisation set based upon the modified pixel value 3) Calculating the error value E(i,j) as the difference between the P'(i,j)−Q(i,j).

4) Modifying one or more of the unprocessed input pixels P(i,j) of the original image by adding to their value a fraction of the error E(i,j) in a way that the fractions add up to 1.0, for example using the "Floyd and Steinberg-"error diffusion weights.

The modification of the error diffusion scheme according to our invention consists of:

a quantisation step in which the value of the pixels forming a cluster, covered by the inkjet dot, are determined from the value of a modified pixel.

an error calculation step in which the difference between the modified and the processed pixels is determined;

an error diffusion step in which at least one unprocessed pixel is modified by at least a portion of the quantisation error value.

During the quantisation step immediately a group of n×m processed pixels, corresponding to the halftone inkjet dot is determined. However, because the error diffusion is still performed at the full resolution of the recording device, the phase (or position) of the halftone dots is controlled at the full resolution of the recording device.

Error Diffusion with Sub-dot Phase Modulation for an Inkjet Printing System

General Embodiment

Using the previous explanation of the standard error diffusion as a basis, we will now explain a first possible embodiment of the invention.

Just like in standard error diffusion, the processing of an image consists of processing the image line-by-line and pixel-by-pixel. The ordering of the pixel processing within a line can be from left to right, from right to left or—preferably—according to a serpentine scan.

One distinguishing characteristic of the new method is that during the "quantisation step" at a position (i,j) not just the value of pixel H(i,j) can be altered, but rather the values of a cluster of adjacent pixels H(x,y) around the position (i,j). Such a cluster can consist of the pixels influenced by the placed inkjet dot.

According to the method according to the invention, a quantisation set containing the quantisation values of the two alternatives—placing a cluster of dark or of light pixels—are evaluated, taking into account density value change upon an area of the inkjet dot corresponding to more than one pixel in the output image and the overlap of the dot with clusters of pixels that were placed by printing a dot in a prior image-processing step. The one alternative quantisation that most closely approximates the modified pixel value P'(i,j) is selected, the appropriate quantisation error is calculated, taking into account inkjet dot overlap, and this error value is distributed to at least one other input pixel.

It is specifically mentioned, that in the decision process of selecting one of the two alternatives—printing a dot or defining a cluster of light pixels—not just the density value change in the output image of the area coinciding with the processed pixel is taken into account, but also the surrounding area affected by printing the inkjet dot.

The cluster of black pixels is determined by the placement of the halftone dot. The alternative choice is normally the definition of a single white pixel, i.e. the cluster has only a single pixel, however the algorithm can include the definition of plural white pixels.

Figure 12B:
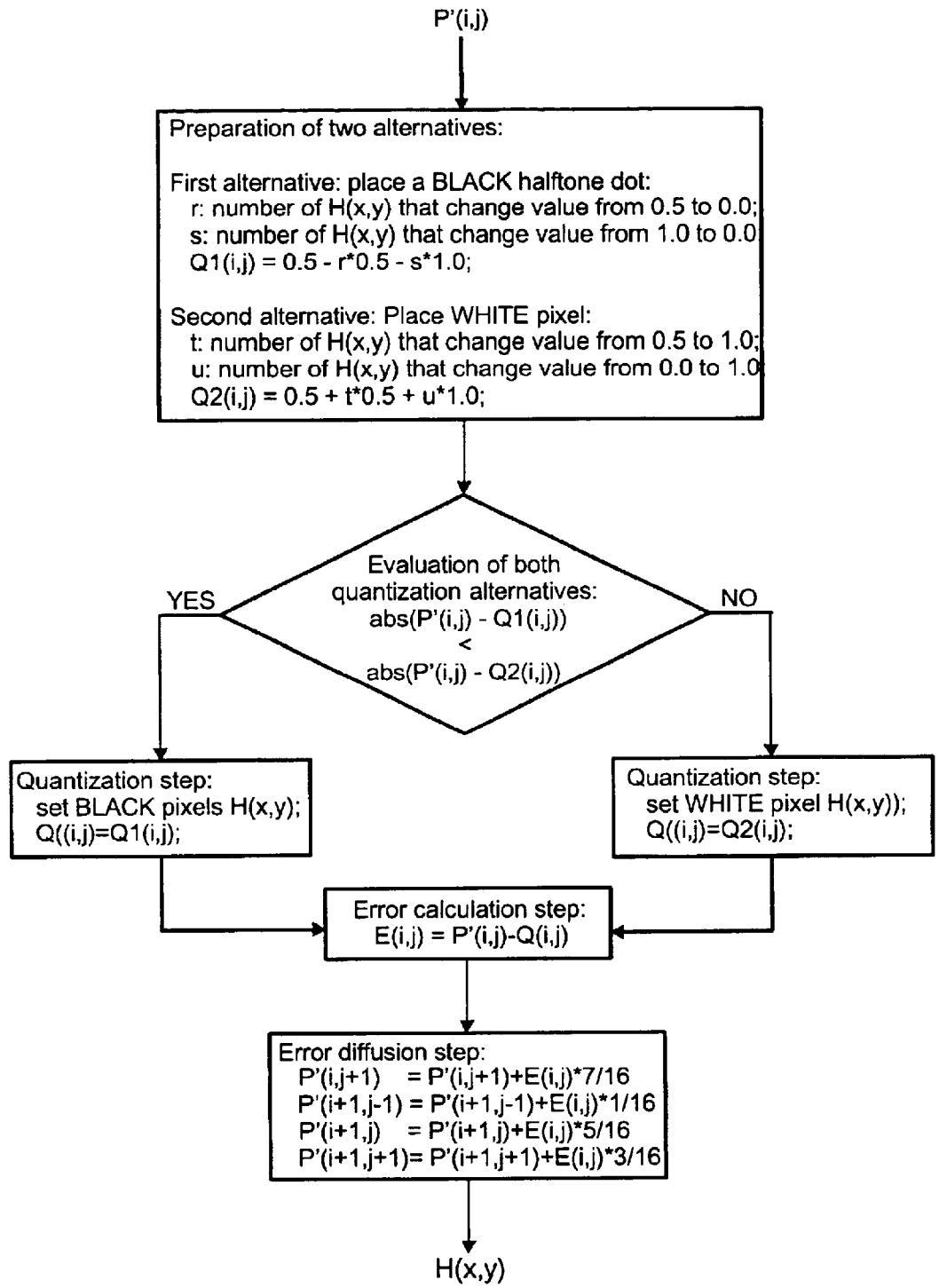
FIG. 12B shows a less conventional description of the error diffusion process according to the invention.

Using the notations, symbols and conventions in the previous explanation of standard error diffusion, the invention can now be generically described by the following sequence of operations that are also summarized in FIG. 12B.

The process of halftoning at the input pixel position P'(i,j) consists of the following steps:

1) Determining the two possible quantised values $Q_1(i,j)$ and $Q_2(i,j)$ of the quantisation set, that correspond to the distinct available cases of:
   a. Placing a cluster of black pixels (determined by the inkjet dot); the quantised value $Q_1(i,j)$ in that case corresponds to $0.5-r*0.5-s*1.0$, in which "r" corresponds to the number of positions that are converted from 0.5 to 0.0 and "s" to the number of pixels that are turned from white (1.0) to 0.0 by placing this cluster of black pixels. It is allowed that a pixel that was made black in a previous step be made black again, but such a pixel is not counted in the determination of "r" to avoid "double counting" of the conversion of pixels from gray to black.
   b. Placing a cluster of white pixels, possibly a single white pixel; the quantised value $Q_2(i,j)$ in that case corresponds to $0.5+t*0.5$, in which "t" corresponds to the number of positions that are converted from 0.5 to 1.0. It is not allowed that a pixel that was made black in a previous step be made white again.

The density value changes upon the areas in the output image of the two distinct cases is taken into account.

2) Selecting a quantisation value. If $Q_1(i,j)$ is closer to P'(i,j) then a cluster of output pixels H(i+x,j+y) around the position (i,j) is set to 0.0 (black) and $Q(i,j)=Q_1(i,j)$; else a cluster of output pixels H(i+x,j+y) is set to 1.0 (white) and $Q(i,j)=Q_2(i,j)$;

3) Calculating the error E(i,j) as the difference between the P'(i,j)−Q(i,j).

4) Modifying one or more of the unprocessed input pixels P(i,j) of the original image by adding a fraction of the error value E(i,j) to their value in a way that the fractions add up to 1.0.

Having described the algorithm in detail, we can now explain why and how the objects of the invention are achieved.

A first observation is that the new method of error diffusion allows the generation of halftone inkjet dots that are substantially larger than one pixel of the addressable grid of the recording device.

It is also clear that the position of the halftone inkjet dots in the new method are controlled by an increment that is substantially smaller than the size of the halftone inkjet dots, it allows for the halftone dots to be placed at any arbitrary position of the pixel grid. The improved control over the phase of the halftone dots enables to achieve our objective to suppress the spatial rounding off effects that otherwise are the cause of disturbing artifacts near rational tone values— and this without the injection of noise into the algorithm.

Since with sub-dot phase modulation many more positions are available for the halftone dots within a single separation, more control is also available to avoid problems related to relative positions of the halftone dots in different separations in color printing.

Even in case that the dot positions would tend to be phase correlated, this correlation can be broken up with the introduction of a smaller amount of randomness into the algorithm than without sub-dot phase modulation.

These observations support the statement that for color printing applications with frequency modulation halftoning, the new method improves the stability and predictability of the color balance and avoids the occurrence of low frequency artifacts, without introducing an objectionable amount of graininess into the image.

The placement of white and black clusters can however be restricted by further rules, possible defined by the recording system. This means that not all distinct cases of placing the clusters are possible or available. Not all quantisation values are to be calculated.

EXAMPLE

Specific Embodiment: "White" Clusters Having a Size of One Pixel and Black Halftone Inkjet Dots Cover a Cluster of 3×3 Pixels In a typical and representative embodiment, the black cluster of pixels is assumed to be a 3×3 cluster defined by the minimum halftone inkjet dot and they can overprint each other or white space, while the white "clusters" consist of only one pixel and can never overprint a black pixel.

The inkjet printing system transferring the halftoned colour separated images to the printing masters has certain characteristics The resolution of the grid on which the halftone dots can be placed is 110 pixels/mm (2750 pixels/inch)

the volume of the small droplets deposited on the printing plate precursor are about 4 pl resulting in a dot size of 30 µm diameter.

Figure 13A:
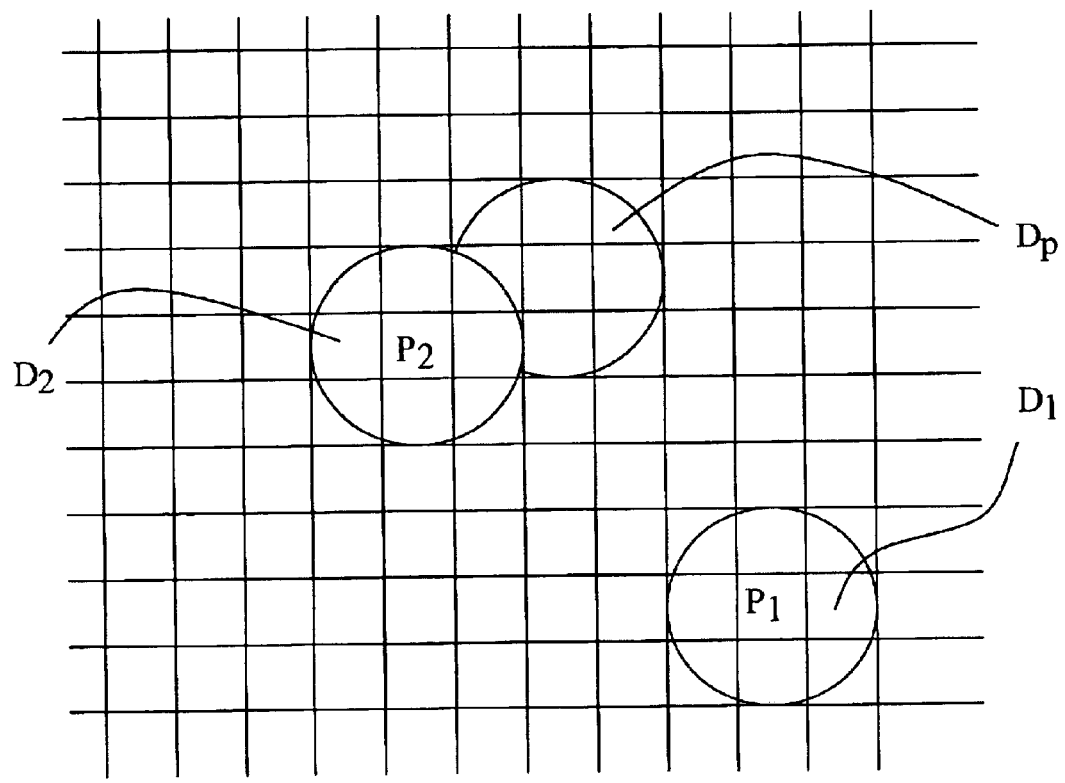
FIG. 13A illustrates the influence of the smallest inkjet dot on surrounding pixels of the recording grid.
Figure 13:
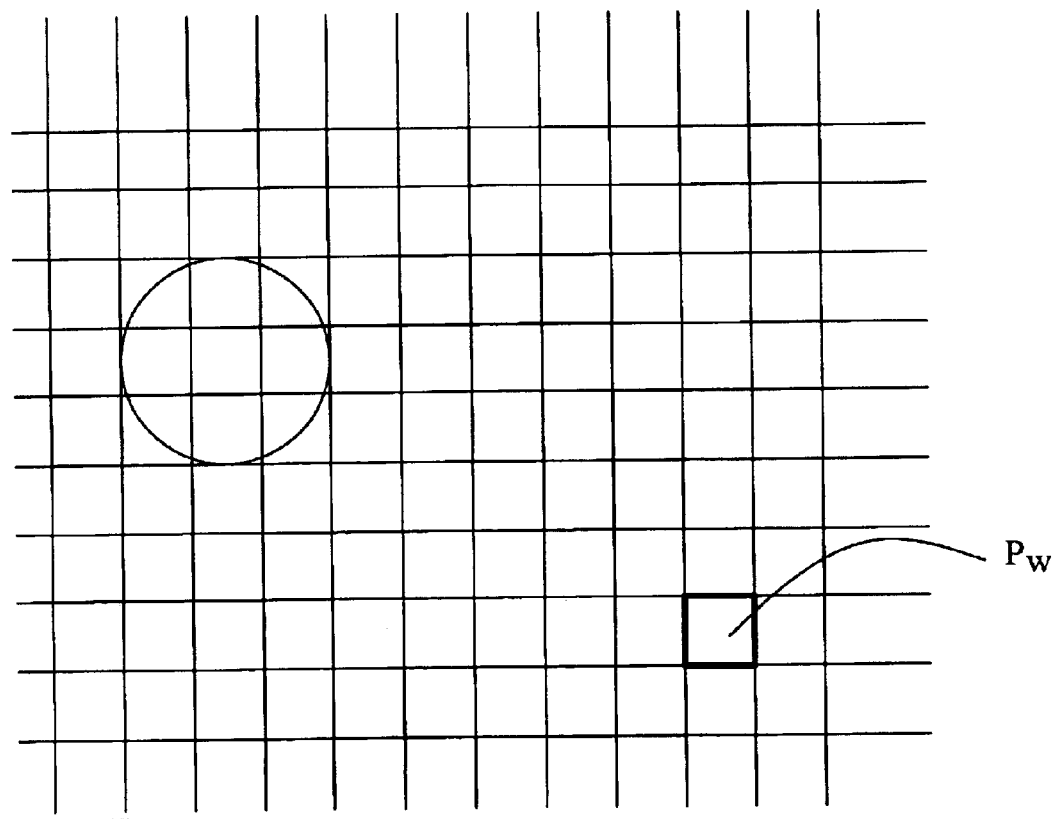
FIG. 13B illustrates absence of influence on the neighbourhood when defining a white pixel.

As shown in FIG. 13A, this means that when placing the smallest dot on the recording grid, an area of about 9 pixels is covered by the ink. This is the case when placing a dot D1 on position p1 shown on the right. Thus placing a single dot at a location within this system causes a density change over a larger area. Normally an area of 9 pixels will be covered. When however, as shown on the left the dot D2 at position p2 overlaps with a pre-existing dot Dp, the influence on the surroundings will be smaller as less dots change from grey to black.

FIG. 13B indicates that not placing a dot and only defining a white pixel $p_W$ has no influence on the surroundings and is only important for the grid location concerned.

In inkjet printing the halftone dot is referenced by the center pixel (i,j) and placing a halftone dot at position (i,j) will cause the pixel values H(i+x,j+y) with $-1<=x<1$ and $-1<=y<$ to go to 0.0 (black). This is also the case when the processing takes place from left to right.

The processing of a modified pixel P'(i,j) than consists of the following steps:

1) Determining the quantisation set of two possible (available) quantised values $Q_1(i,j)$ and $Q_2(i,j)$, that correspond to the distinct cases of:
   a. Placing a black halftone dot; the quantised value $Q_1(i,j)$ in that case corresponds to 0.5-f*0.5, in which f corresponds to the (maximum 9) positions that are converted from 0.5 to 0.0 by placing the halftone dot. The positions that already were at a value of 0.0 as a result of a previous processing step are not counted in the determination of $Q_1(i,j)$ to avoid "double counting" of the conversion of pixels from gray to black.
   b. Placing a white pixel. Depending on the value of H(i,j), two cases are to be distinguished:
      i. Either H(i,j) was still at the preset value of 0.5; in that case H(i,j) is converted from 0.5 to 1.0 to become a white (1.0) pixel, and $Q_2(i,j)$ becomes 1.0 (white) to reflect the conversion of that pixel from gray to white.
      ii. Or H(i,j) was previously set to 0.0 as a result of the placement of a black halftone dot in a previous processing step. Since a black pixel cannot be turned into a white pixel again, the value of H(i,j) remains at 0.0 and $Q_2(i,j)$ is set to 0.5, to reflect the fact that value at H(i,j) at position (i,j) was left unaltered in processing the pixel at position (i,j).
2) If $Q_1(i,j)$ is closer to P'(i,j) then the pixels H(i+x,j+y) of the halftone dot at position (i,j) are all set to 0.0 and $Q(i,j)=Q_1(i,j)$ else $Q(i,j)=Q_2(i,j)$ and H(i,j) can take two values corresponding to the cases (i) or (ii) explained for case 1b.
3) Calculating the error E(i,j) as the difference between the P'(i,j)–Q(i,j).
4) Modifying one or more of the unprocessed pixels P'(i,j) of the original image by adding to them a fraction of the error value E(i,j) in a way that the fractions add up to 1.0.

It is clear that this method enables the exact control of the position of halftone dots consisting of a plurality of pixels on the pixel grid. The dots can be placed at any arbitrary position of the pixel grid to optimally represent the input image to be converted. Density value changes of an area in the output image are taken into account.

Considerations on the Reference Point of the Halftone Dot

Figure 14A:
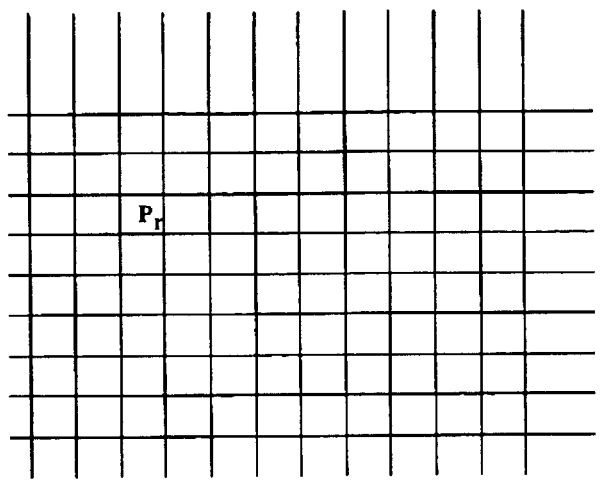
FIG. 14A illustrates the situation wherein the centre pixel of the inkjet dot is taken as reference point.

When for a pixel the decision is taken to print a halftone dot, the dot will overlap with pixels to be processed later but also with pixels for which the decision has already been taken. As shown in FIG. 14A the inkjet recorder normally prints the center of the halftone dot at the location of the processed pixel.

In the example using 3×3 halftone dots, the decision to print a halftone inkjet dot for a certain pixel p(x,y) normally also affects the surrounding pixels p(x−1,y−1), p(x−1,y), p(x−1,y+1), p(x,y+1), p(x+1,y+1), p(x+1,y), p(x+1,y−1), p(x,y−1).

The reference pixel also serves as a center of gravity for the inkjet halftone dot. This can lead to certain instabilities using the algorithm. When using a error diffusion method with a serpentine scan however, certain adjustments need to be taken.

The final output needed to drive the inkjet printer is not the bitmap indicating which pixels will be covered by ink but a dot location map indicating these centers of gravity at which positions a halftone inkjet dot is to be printed.

Figure 14B:
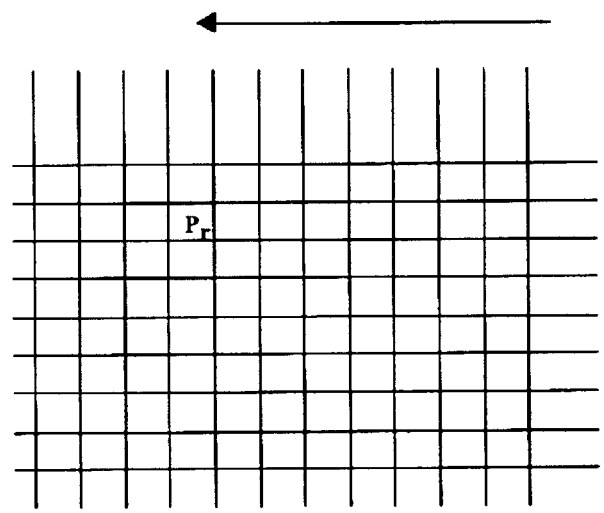
FIG. 14B illustrates the situation wherein the firs processed corner pixel of the inkjet dot is taken as reference point.
Figure 14C:
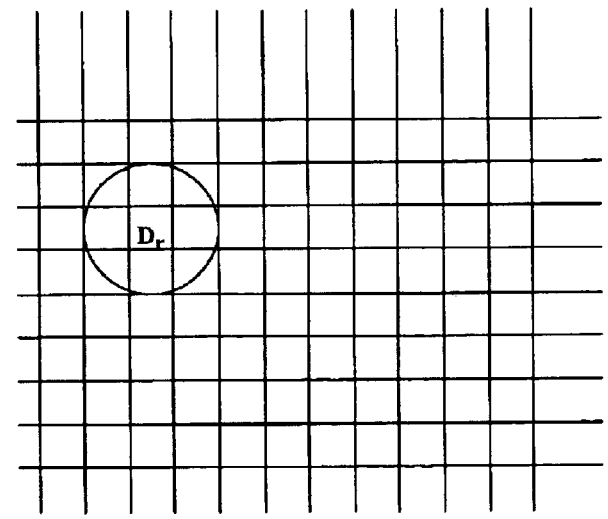
FIG. 14C illustrates a dot location map indicating where dots are to be printed.

Therefore it is also possible that the pixel which serves as a reference point and for which a decision is taken to place a halftone dot is not located in the center of the halftone dot as indicated in FIG. 14B. The dot is then printed using another pixel as center of gravity. The decision taken for a pixel p(x,y) to print a halftone inkjet dot results in printing a pixel at location p(x+1,y+1) thereby also affecting the surrounding pixels p(x,y), p(x,y+1), p(x,y+2), p(x+1,y+2), p(x+2,y+2), p(x+2,y+1), p(x+2,y), p(x+1,y). The appropriate position is then marked in the dot location map instructing the printer where to print the dots. In this case no density change is caused by a newly positioned halftone dot on pixels which have already been processed. In this way no density change is done on already processed pixels. An illustration of a dot location map is given in FIG. 14C.

Refinement of the Algorithm by Including Coverage Percentage

Halftone dots in laser recording systems are composed of clusters of microdots each written on the location of a pixel. In laser recording the shape of the microdots is controllable by adjusting the laser beam profile. The area of the written microdots corresponds to the pixel area which is completely filled and overlap between microdots can be neglected.

In above mentions method it is considered that the value of the canvas is set from value 0.5 (gray) to 0.0 (black) or to 1.0 (white). It is also possible that a white pixel is transformed into a black pixel.

Figure 15:
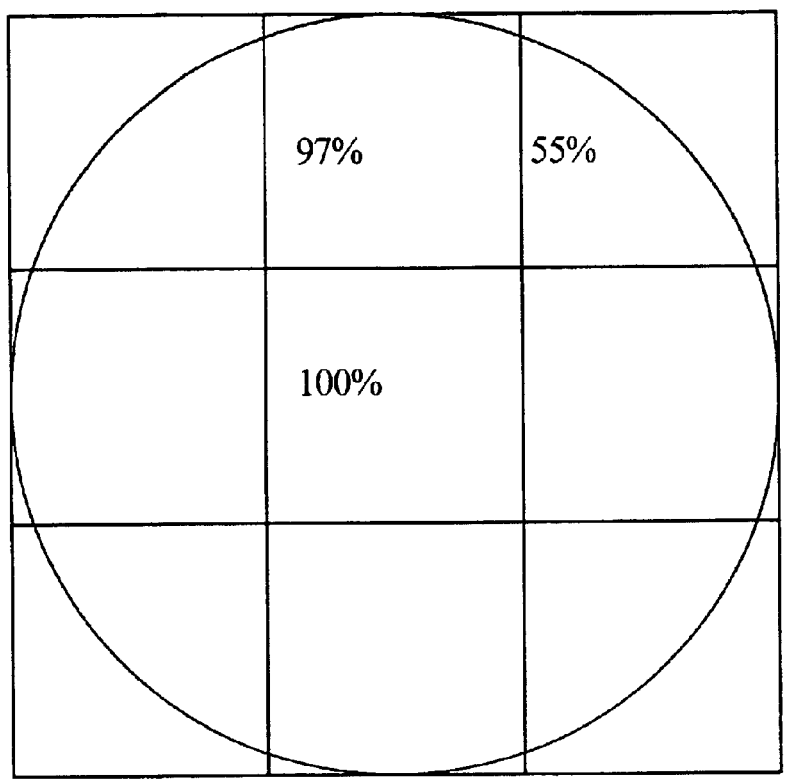
FIG. 15 shows a possible coverage percentage of an inkjet dot over the pixels of a grid.

FIG. 15 shows however that the amount of ink deposited upon a surrounding pixel may vary with its position regarding the center pixel. The pixel is not fully occupied by ink.

In the example the center pixel p(x,y) is always fully covered with ink.

The vertical and horizontal neighbors p(x−1,y), p(x+1,y), p(x,y−1), p(x,y+1) of the center pixel, receive about 97% ink.

The diagonal neighbors p(x−1,y−1), p(x+1,y+1), p(x+1,y−1), p(x−1,y+1) are only covered by ink over an area of 55%.

The algorithm can be refined by taking this partial occupation by ink into account.

In the given illustration the density value change induced for a gray canvas can be 0.5, 0.47 or 0.05.

Depending upon the size and eventually shape of the halftone inkjet dot the influence upon the surrounding pixels needs to be assessed and value changes for each influenced pixel have to be calculated.

Figure 16:
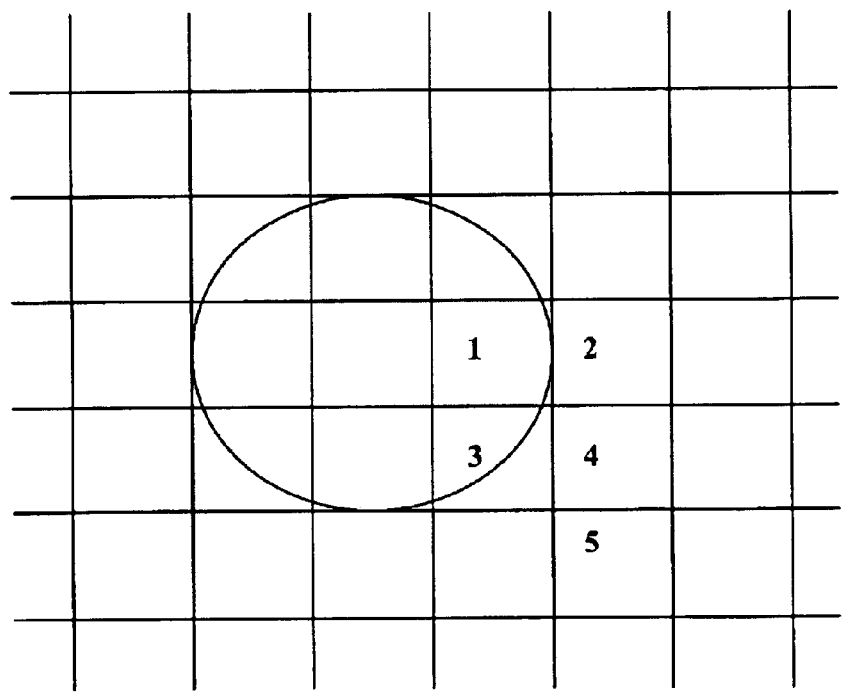
FIG. 16 shows possible types of overlap for dots according to FIG. 15.

The value of a corner pixel partially covered by a halftone dot thus change the canvas value of 0.5 only for a value of 0.05. When the existing halftone dot is later overlapped by a second halftone dot the value may further decrease to about 0.176 or 0.05 depending on the type of overlap of the halftone dots. The dots may have overlapping corner pixels, but as illustrated, in the example of FIG. 16 the gravity center of an overlapping halftone dot may be located at 6 different positions leading to different resulting density values.

The dot size given in the examples is only illustrative. An important aspect in this refinement is that the algorithm is to be adapted to the actual dot size used.

Multilevel Embodiments

The above explained standard sub dot phase modulation algorithm can be extended to a multilevel algorithm.

Although in printing there is only the possibility to have ink coverage and no ink deposition. There is a possibility to use multilevel systems. One could imaging a printing system using black and gray ink leading to the possibility of having more than two in levels on the receiving layer, (printed paper). Printing systems do exist using multiple density inks for magenta and cyan. Each image is e.g. printed using Yellow, light Magenta, dark Magenta, Light Cyan, dark Cyan and Black ink.

The light and dark inks will be printed using different printing plates, but the decisions to print a light or dark halftone dot are to be considered at the same time. For each pixel processed there are three possibilities.

Let us assume that the intermediate level has a density value of 0.5.

The process of halftoning at the input pixel position $P'(i,j)$ consists of the following steps:

1) Determining the tree possible quantised values $Q_1(i,j)$, $Q_2(i,j)$ and $Q_3(i,j)$ of the quantisation set, that correspond to the distinct available cases of:
   a. Placing a cluster of black (possible dark cyan or dark magenta) pixels, determined by the inkjet halftone dot; the quantised value $Q_1(i,j)$ in that case corresponds to 0.5−r*0.5−s*1.0, in which "r"corresponds to the number of positions that are converted from 0.5 to 0.0 and "s"to the number of pixels that are turned from white (1.0) to 0.0 by placing this cluster of black pixels. It is allowed that a pixel that was made black in a previous step be made black again, but such a pixel is not counted in the determination of "r"to avoid "double counting"of the conversion of pixels from gray to black.
   b. Placing a cluster of gray black (possible light cyan or light magenta) pixels determined by the gray inkjet halftone dot; the quantised value $Q2(i,j)$ in that case corresponds to 0.5−s*0.5, in which "s"corresponds to the number of pixels that are turned from white (1.0) to 0.5 by placing this cluster of gray pixels.
   c. Placing a cluster of white pixels, possibly a single white pixel; the quantised value $Q3(i,j)$ in that case corresponds to 0.5+t*0.5, in which "t"corresponds to the number of positions that are converted from 0.5 to 1.0. It is however not allowed that a pixel that was made black or gray in a previous step be made white again.

The density value changes upon the areas in the output image of the tree distinct cases is taken into account.

2) Selecting a quantisation value. If $Q_1(i,j)$ is closer to $P'(i,j)$ then a cluster of output pixels $H(i+x,j+y)$ around the position (i,j) is set to 0.0 (black) by printing a black halftone dot and $Q(i,j)=Q_1(i,j)$; If $Q2(i,j)$ is closer to $P'(i,j)$ then a cluster of output pixels $H(i+x,j+y)$ around the position (i,j) is set to 0.5 (gray) and $Q(i,j)=Q2(i,j)$, else a cluster of output pixels $H(i+x,j+y)$ is set to 1.0 (white) and $Q(i,j)=Q_3(i,j)$;

3) Calculating the error $E(i,j)$ as the difference between the $P'(i,j)−Q(i,j)$.

4) Modifying one or more of the unprocessed input pixels $P(i,j)$ of the original image by adding a fraction of the error value $E(i,j)$ to their value in a way that the fractions add up to 1.0.

Even when using a single ink for reproducing a color, it is possible to use a multilevel system. Inkjet systems are usually capable to print more than one dot size. Therefore for each processed input pixel it is possible to make the decision to:

print a large inkjet halftone dot.

print a small inkjet halftone dot not to print a halftone dot.

As an example it would be possible to print small halftone dots of 3×3 pixels and to use large halftone dots covering an area of 5×5 pixels. Here also tree quantisation values have to be calculated in order to take a decision.

Example of a Variable Halftone Dot Size Method

In the discussion of the existing art we mentioned already that the choice of an appropriate halftone dot size represents a compromise. It was explained that the graininess in highlight and shadow regions is reduced by printing with smaller halftone dots, while the stability of contrast and color balance in the mid-tones benefits from using a larger halftone dot. We also mentioned that the contours of solid text and graphics preferably are rendered with a halftone dot size of just one pixel.

In what follows we present a variation of the sub-dot phase modulation scheme that enables using a variable dot size for three different tonal ranges, Range1, Range2 and Range3, separated by the values SecondBorderToneValue and FirstBorderToneValue. So the three tonal ranges are:

Range1: [0.0,FirstBorderToneValue]

Range2: [FirstBorderToneValue, SecondBorderToneValue]

Range3: [SecondBorderToneValue,1.0]

Depending upon the position of the border values of the tonal Ranges, the terms Shadowborder and HighlightBorder could be used for the BorderToneValues. More generally stated, the cluster size covered by the inkjet halftone dot can be adjusted depending upon the input pixel value. Possible quantisation levels are restricted based upon input pixel value.

We assume that the size of the halftone dot can alter between two sizes of n by m pixels or q by p, with q>n and p>m. In what follows, we denote the halftone dot size with a size of h by w pixels as h×w, with n<=h<=q and m<=w<=p We assume that the halftone dot is referenced by the top left pixel (i,j) if the processing takes place from left to right. What this means is that placing a halftone dot at position (i,j) affects the pixel values $H(i+x,j+y)$ with 0<=x<w and 0<=y<h. If the processing takes place from right to left, the halftone dot is referenced by the top right pixel (i,j). Placing a halftone dot at position (i,j) affects the pixel values $H(i+x,j+y)$ with −w<x<=0 en 0<=y<h.

For driving the printer the pixel serving as gravity center is put into the dot location map.

Using the notations, symbols and conventions in the previous explanation, the third embodiment of the invention can now be described as the following sequence of operations:

The processing of a halftone dot at the pixel position (i,j) consists of the following steps:

1. Determining the halftone dot size, as a function of the unmodified pixel value P(i,j):
   a. If (P(i,j)<FirstBorderToneValue) than (halftone dot size (h,w) will be h=q and w=p)
   b. If (SecondBorderToneValue>=P(i,j)>=FirstBorderToneValue) than (halftone dot size changes proportionally from h=q, w=p at FirstBorderToneValue, till h=n, w=m at SecondBorderToneValue)
   c. If (P(i,j)>SecondBorderToneValue) than (halftone dot size (h,w) will be h=n and w=m)
2. Determining the two possible quantised values $Q_1(i,j)$ and $Q_2(i,j)$, that correspond to the distinct cases of placing a halftone dot or not, calculating the error and modifying the unprocessed pixels with an amount of the error is exactly the same as described above in the case without variable dot size.

Even though the above example has been given for a tonal range subdivided into three sub-ranges, it should obvious to anyone skilled in the art that the same principles can be used for subdividing the tonal range into any number of sub-ranges. In yet another embodiment, the transition from one halftone dot size to another one does not occur at a fixed tonal value, but rather is spread out over a range of tonal values. This effect is for example obtained by determining the decision of the halftone dot size on the sum of P(i,j) and a small random number. The addition of a random number causes the transition from one dot size to another to occur randomly at a slightly higher or lower tonal values, yielding the desired effect of spreading out the transition from one halftone dot size to another one over a range of tonal values.

It is also possible to include a halftone dot distribution alteration step in low and high intensity image regions. The above embodiment can also be used to render solid text and line art with a cluster size of one pixel, so that their contours are rendered at full resolution. This can be done by setting the output value of the pixel to the corresponding minimum or maximum output value if the input pixel value is the minimum or maximum possible input value.

Yet another variation of the above embodiment uses halftone dots consisting of fewer pixels for the rendering of image areas containing a high degree of local contrast, such as textures or object boundaries than for image areas containing a low degree of local contrast.

For this to happen, an unmodified pixel is categorized as belonging to an area containing low local contrast, medium local contrast or high local contrast. Depending on to which category the pixel belongs, a large medium or small halftone dot size is produced. Categorizing the amount of local contrast is based on measuring the variation of unmodified pixel values in an area around the unmodified pixel P(i,j). A simplified approach simply uses the difference between the smallest and largest unmodified pixel value in the area around an unmodified pixel P(i,j). More sophisticated methods that rely on an analysis of the histogram of local neighborhoods are possible to quantify the degree of local contrast and to control the local halftone dot size.

Imprint Function

One of the most valuable enhancements of the sub-dot phase modulation is the use of the imprint function as described by Eshbach in U.S. Pat. No. 5,535,019.

The invention in U.S. Pat. No. 5,535,019 is directed to an error diffusion halftoning scheme for the conversion of an image described at c optical density levels to an image described with d optical density levels (where c>d>1) in which the quantisation process is varied to produce a homogeneous pulse distribution in low and high intensity image regions, while retaining a standard error diffusion-like response in midtone regions.

In accordance with one aspect of the invention of Eschbach (U.S. Pat. No. 5,535,019), a method is provided of quantising pixels in an image formed by a plurality of pixels, each pixel constituting an image signal representing optical density of the image at a location therein, and having an original optical density value selected from one of a set of 'c' original optical density values that has a number of members larger than a desired output set of 'd' optical density values, through a process of error diffusion. In this process, 'c' and 'd' are integer values representing pixel depth. For an input image so comprised, initially, an image signal is initially modified in accordance with previously determined error. Thereafter, during the quantisation step of the process, the threshold signal for quantisation determination is dynamically adjusted in accordance with previous output quantisation determinations to selectively control likelihood of whether the next pixel will exceed the threshold. The threshold level is selectively modified on a pixel by pixel basis to increase or decrease the likelihood that the next pixel will be quantised to one state or another state. In addition to this control, however, the increase or decrease in the threshold level is based upon a regional input intensity. With the threshold signal set as described, the modified input signals is evaluated, and an output signal that is one of d levels is determined accordingly.

Subsequent to quantisation, the difference between the determined output signal and the modified input signal is evaluated and an error signal is computed, to be dispersed for addition to a pre-selected group of unevaluated neighboring signals.

In accordance with another aspect of the invention of Eschbach U.S. Pat. No. 5,535,019, in order to generate the dynamically varying threshold value for the quantisation process described in a two-dimensional manner, the one-dimensional imprint threshold signals for the previous scan lines are modified for use in the current scan line. The two-dimensional threshold signals is generated in accordance with a function:

$$\text{threshold }(m,n) = D \times \text{threshold }(m,n-1)$$

where D is a selected dampening factor.

In the present invention a better final result can be obtained by dynamically influencing the threshold value used in the error diffusion algorithm, lowering the probability of inhomogeneous dot distribution based upon intensity measurement of an area including the input pixel, reference signals of the previous scan lines and stored threshold imprint values.

Thus preferably the imprint function is included in the error diffusion algorithm.

Including Constraint Correlation Over Different Color Separations

Figure 17:
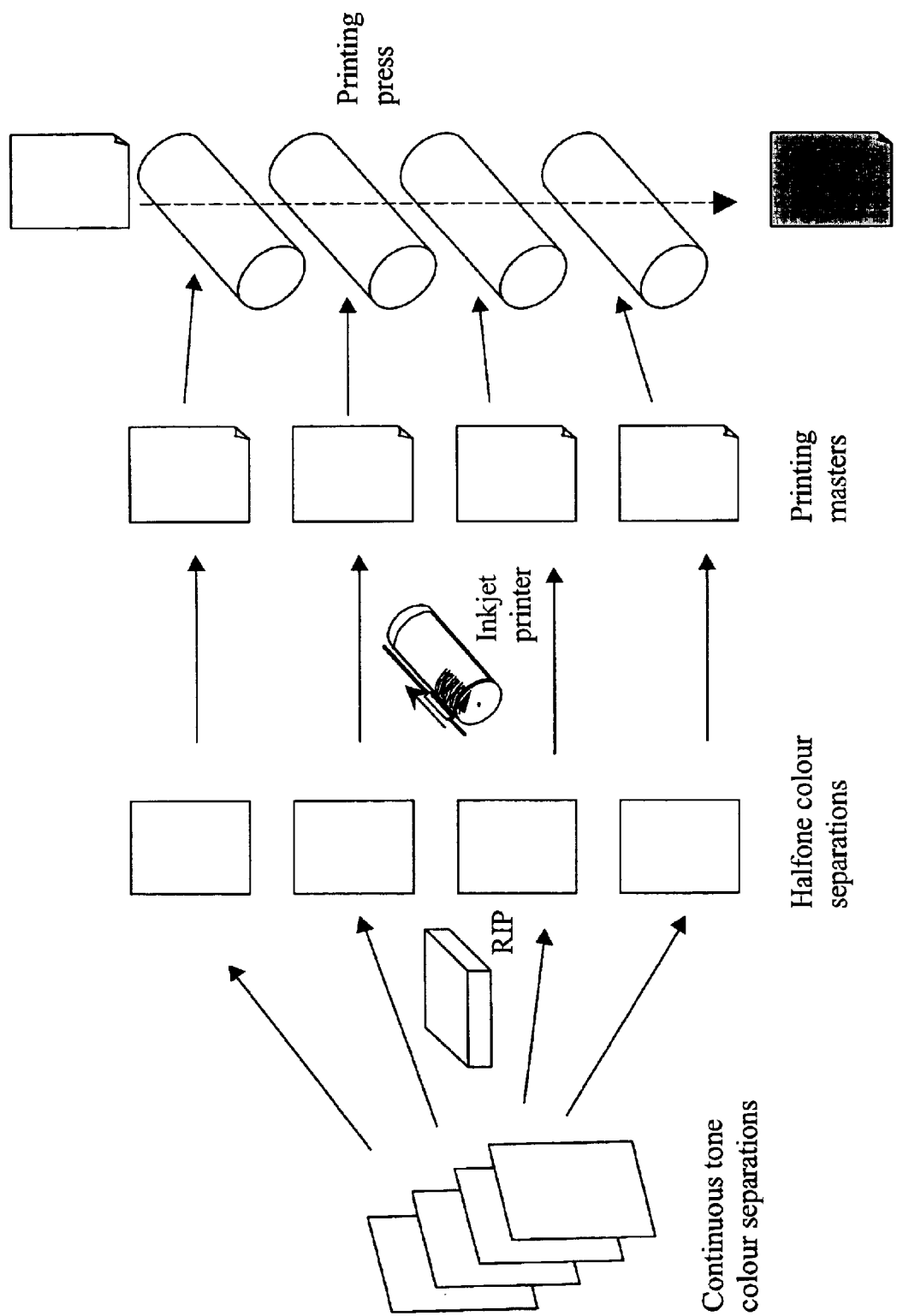
FIG. 17 shows the workflow in a 4 colour computer to plate system using inkjet printing systems to make the printing masters.

FIG. 17 illustrates a possible workflow in colour printing systems.

the information of the input colour image is given by four continuos tone colour separations.

using the halftoning algorithm for each printing colour a halftone colour separation image is obtained.

Each halftone separation is transferred onto a printing plate precursor by an inkjet printer to obtain a set of (four) printing masters.

The final image is reproduced on a printing press using the four printing masters.

Each input colour pixel is thus represented by a combination of output colour pixels. Due to the halftoning process an exact match of the colour and brightness is not always possible.

Due to the error diffusion process, deviations are distributed to the surrounding pixels as the fault in the error diffusion process.

Certain combinations of output colour pixels may however lead to unstable reproduction of the image input pixel which can give differences in overall brightness and or colour. When comparing the contrast sensitivity curves measured from monochrome gratings with those of coloured gratings, it is immediately clear that high-frequency errors in the luminance channel are more noticeable than those in the chrominance channels. This implies that isolated dots will be far more noticeable when they differ in luminance with their background than when they differ in chrominance and have a similar luminance.

By including a further rules in the halftoning algorithm placing a restriction upon the possible correlation of different halftone dots in the different output colour separations, these effects can be avoided and even better image reproduction can be obtained.

Unfavourable interactions between different colour separations is kept under control.

In following example the overall brightness is especially guarded. Certain output colour pixel combinations are avoided.

Consider an colour image forming process using k different inks or primaries wherein each ink $I_k$ has $N_k$ possible density levels. Thus $I_1$ has $N_1$ possible levels, $I_2$ has $N_2$ possible levels, . . . .

For this printing process with k primaries $I_1, \ldots ,I_k$, having $N_1, \ldots ,N_k$ intensity levels respectively, an embodiment according to the present invention can be described as follows.

The input image is determined by the input colour component values.

A scalar value is determined wherein the scalar value is at least a function of one of said input pixel values of said spatially corresponding component pixels;

First a scalar value, in this case the brightness level, is determined.

The Brightness $B=(N_1-1-I_1)+(N_2-1-I_2)+ \ldots +(N_k-1-I_k)$.

The scalar value B is quantised using a multilevel halftoning process. The number of quantisation levels for B is preferably $M=1+(N_1-1)+(N_2-1)+ \ldots +(N_k-1)$ but will generally be situated in the range $k-N_1+N_2+ \ldots +N_k$. Even more preferably the allowed quantised B-value for an output pixel is restricted to be the one just above or below or on the original B-value of the input pixel.

A separate error diffusion process applied to the B-value is an M-level error diffusion process, operating independently from the colour error diffusion. The outcome of the Brightness-error diffusion is used to guide the colour-error diffusion This guiding is done by selecting a set of intensity-level combinations which is a subset of the complete set of all possible intensity-level combinations.

For $B=i, 0 \leq i \leq (N_1-1)+(N_2-1)+ \ldots +(N_k-1)$, the level set Bi contains all possible combinations yielding B=i.

Figure 18:
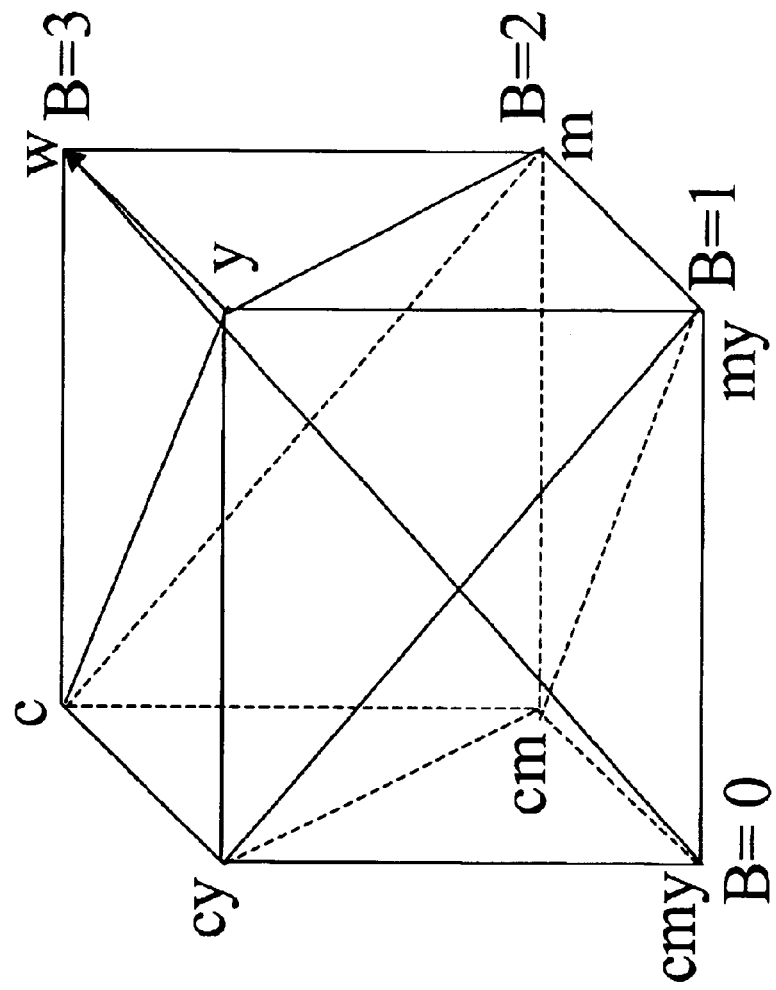
FIG. 18 depicts a sub-hypercube of a three colour system containing $2^3$ points

To reduce the number of computations as well as to improve the quality of the halftoning, the quantisation colour of an output pixel is restricted by an extra output colour restriction to be one of the colours situated on the corners of the sub-hypercube in which the original colour of the input pixel is situated. Each k-dimensional sub-hypercube contains $2^k$ points. A representation of such a sub-hypercube for a three colour system is given in FIG. 18.

The intersection of this set of $2^k$ points with the set of points having a B-level equal to the quantised B-level that is obtained in the B-error diffusion process is non-void. The quantisation colour is preferably determined to be the point in this intersection that is closest to the modified pixel colour in the k-dimensional colour space. The modified pixel colour is equal to the original input pixel colour +colour errors received from previously processed pixels. The error to be diffused is the difference between the modified pixel colour and the quantised pixel colour. This difference is calculated in each of the colour channels separately.

Thus when using constraint correlation, a method for creating at least two printing master is used comprising the steps of:

providing printing master precursors, selectively creating ink carrying and non-ink carrying areas on said printing masters precursor by means of an ink jetting system printing inkjet dots on the printing master precursors wherein the position of the inkjet dots is controlled with an increment that is less than the size of the smallest inkjet dot, wherein the position of the inkjet dots is controlled by a sub-dot phase modulation error diffusion algorithm, and wherein:

a scalar value is computed which is a function of at least one of said input pixel values of said spatially corresponding component pixels;

said scalar value is quantised by a multilevel halftoning process to obtain for said colour pixel a quantised scalar value;

said quantised scalar value is used to select, out of all said intensity level combinations, a subset of intensity level combinations;

one combination out of said subset is selected;

using said selected combination for reproducing said colour pixel for controlling the inkjet printing system during creation of the printing masters.

Preferably also variability in printing press properties are included in setting the rules to constraint colour dot correlation.

Having described in detail preferred embodiments of the current invention, it will now be apparent to those skilled in the art that numerous modifications can be made therein without departing from the scope of the invention as defined in the appending claims.

What is claimed is:

1. Method for creating at least one printing master comprising the steps of:

providing a printing master precursor, selectively creating ink-carrying and non ink-carrying areas on said printing master precursor by means of an ink jet printing system printing dots on the printing master precursor wherein the position of the dots is controlled with an increment that is less than the size of the smallest dot, characterised in that the position of the dots is controlled by a sub-dot phase modulation error diffusion algorithm.

2. The method according to claim 1 wherein the printing master is a planographic printing plate and wherein the printed dots generate hydrophobic and hydrophilic areas.

3. The method according to claim 1 wherein the error diffusion algorithm comprises a imprint function dynamically influencing the threshold values in the error diffusion algorithm in accordance with previous output quantisation determinations to selectively control likelihood of whether the next pixel will exceed the threshold.

4. The method according to claim 1 wherein the error diffusion algorithm takes into account the coverage percentage of the pixels caused by the printed dots.

5. The method according to claim 1 wherein the inkjet printing system is a multilevel inkjet printing system.

6. The method according to claim 5 wherein the inkjet printing system uses at least two different dot sizes.

7. The method according to claim 1 wherein the position of the dots can be controlled according to the pixel grid generated by the addressability of the inkjet printing system and the area of the smallest dot correspond to the area of 3×3 pixels of the pixel grid.

8. The method according to claim 1 wherein at least two printing masters are made and wherein the error diffusion algorithm is further limited by use a constrained correlation frequency modulation halftoning technique wherein the placement of dots is restricted by a multilevel error diffusion process applied to a scalar value.

9. An inkjet printing master made by the method according to claim 1.

10. An apparatus for making at least one printing master comprising:

a device for providing a printing master precursor a inkjet printing system for printing dots on the printing master precursor, selectively creating ink-carrying and non ink-carrying areas on the printing master precursor thereby generating the printing masters and for controlling the position of the dots with an increment that is less that the size of the smallest dot, wherein in the apparatus comprises a processing device for performing a sub-dot phase modulation error diffusion algorithm for controlling the position of the dots.

* * * * *